United States Patent
Smolyanskaya et al.

(10) Patent No.: US 11,875,543 B2
(45) Date of Patent: Jan. 16, 2024

(54) DUPLICATING AND AGGREGATING DIGITAL INK INSTANCES

(71) Applicant: Microsoft Technology Licensing, LLC, Redmond, WA (US)

(72) Inventors: Irina Smolyanskaya, Seattle, WA (US); Julio Estrada, Santa Ynez, CA (US); Aaron D. Cottle, Westerville, OH (US); Yibo Sun, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/202,430

(22) Filed: Mar. 16, 2021

(65) Prior Publication Data

US 2022/0300734 A1 Sep. 22, 2022

(51) Int. Cl.
*G06F 3/04883* (2022.01)
*G06V 30/32* (2022.01)
*G06F 40/171* (2020.01)

(52) U.S. Cl.
CPC .......... *G06V 30/36* (2022.01); *G06F 3/04883* (2013.01); *G06F 40/171* (2020.01); *G06V 30/347* (2022.01)

(58) Field of Classification Search
CPC ... G06V 30/36; G06V 30/347; G06F 3/04883
See application file for complete search history.

(56) References Cited

U.S. PATENT DOCUMENTS 6,766,494 B1 * 7/2004 Price ..................... G06F 40/131
 715/203
7,372,993 B2 5/2008 Lagardere et al.
(Continued)

FOREIGN PATENT DOCUMENTS

| CN | 108027873 A | 5/2018 |
|----|---|---|
| CN | 110827596 A | 2/2020 |
| EP | 0965907 A2 | 12/1999 |
| EP | 2806347 A2 | 11/2014 |
| WO | 2007082271 A2 | 7/2007 |
| WO | 2016137694 A1 | 9/2016 |

OTHER PUBLICATIONS

"Computer Graphics Processing and Selective Visual Display Systems", Retrieved From: https://www.uspto.gov/web/patents/classification/uspc345/defs345.pdf, Jan. 2011, 50 Pages.
(Continued)

*Primary Examiner* — Keith D Bloomquist
(74) *Attorney, Agent, or Firm* — NovoTechIP International PLLC

(57) ABSTRACT

Systems and methods for aggregating digital ink instances within an electronic document. One system includes a memory configured to store instructions and an electronic processor coupled to the memory. The electronic processor, through execution of the instructions in the memory, is configured to receive detected interactions between a touch-screen and a digital pen representing one or more digital strokes within a canvas and determine whether the one or more digital strokes match a predetermined signifier. The electronic processor is also configured to, in response to determining that the one or more digital strokes match the predetermined signifier, determine a first digital ink instance included in the electronic document based on a position of the one or more digital strokes within the canvas, duplicate the first digital ink instance to create a second digital ink instance, and add the second digital ink instance to a designated portion of the electronic document.

19 Claims, 25 Drawing Sheets

(56) References Cited

U.S. PATENT DOCUMENTS

| | | | |
|---|---|---|---|
| 8,478,777 B2 | 7/2013 | Li et al. | |
| 9,201,520 B2 | 12/2015 | Benko et al. | |
| 9,448,643 B2 | 9/2016 | Hicks | |
| 10,613,748 B2 | 4/2020 | Alcorn et al. | |
| 2001/0048436 A1 | 12/2001 | Sanger | |
| 2002/0064308 A1 | 5/2002 | Altman et al. | |
| 2002/0088651 A1* | 7/2002 | Carini | G06F 3/0488 178/18.01 |
| 2003/0016253 A1 | 1/2003 | Aoki et al. | |
| 2004/0054701 A1 | 3/2004 | Garst | |
| 2004/0205677 A1 | 10/2004 | Hughes et al. | |
| 2004/0263486 A1 | 12/2004 | Seni | |
| 2005/0202804 A1* | 9/2005 | Silverbrook | G06F 3/1285 455/411 |
| 2006/0018546 A1 | 1/2006 | Agardere et al. | |
| 2006/0061776 A1 | 3/2006 | Chen et al. | |
| 2006/0078202 A1 | 4/2006 | Shilman et al. | |
| 2008/0101682 A1 | 5/2008 | Blanford et al. | |
| 2008/0260240 A1 | 10/2008 | Vukosavljevic et al. | |
| 2010/0073297 A1 | 3/2010 | Beckwith et al. | |
| 2013/0106797 A1 | 5/2013 | Pant et al. | |
| 2013/0191785 A1 | 7/2013 | Rampson et al. | |
| 2013/0241832 A1 | 9/2013 | Zachut et al. | |
| 2014/0015776 A1 | 1/2014 | Kim et al. | |
| 2014/0253521 A1 | 9/2014 | Ticks | |
| 2014/0337804 A1 | 11/2014 | Viswanathan et al. | |
| 2014/0347328 A1 | 11/2014 | Edgecomb et al. | |
| 2014/0365978 A1* | 12/2014 | Fish | G06F 3/017 715/863 |
| 2014/0377733 A1 | 12/2014 | Olsen, Jr. | |
| 2015/0015504 A1 | 1/2015 | Lee et al. | |
| 2015/0205398 A1* | 7/2015 | Le | G06F 3/04883 345/173 |
| 2015/0338939 A1 | 11/2015 | Vong | |
| 2015/0339050 A1 | 11/2015 | Vong | |
| 2016/0026327 A1 | 1/2016 | Park et al. | |
| 2016/0048318 A1 | 2/2016 | Markiewicz | |
| 2016/0179772 A1* | 6/2016 | Perrin | G06F 40/106 715/268 |
| 2016/0364091 A1 | 12/2016 | Bernstein et al. | |
| 2017/0068445 A1 | 3/2017 | Lee et al. | |
| 2017/0153728 A1 | 6/2017 | Takahashi et al. | |
| 2017/0212612 A1 | 7/2017 | Zhou et al. | |
| 2018/0300541 A1 | 10/2018 | Mikutel et al. | |
| 2018/0329589 A1 | 11/2018 | Sonnino et al. | |
| 2019/0114308 A1 | 4/2019 | Hancock | |
| 2019/0205772 A1 | 7/2019 | Kohlmeier et al. | |
| 2019/0235648 A1 | 8/2019 | Ligameri et al. | |
| 2019/0265828 A1 | 8/2019 | Hauenstein et al. | |
| 2020/0326829 A1 | 10/2020 | Hu et al. | |
| 2021/0279457 A1 | 9/2021 | Suyash | |
| 2022/0300131 A1 | 9/2022 | Cottle | |
| 2022/0300702 A1 | 9/2022 | Cottle | |

OTHER PUBLICATIONS

"The Authoritative Dictionary of IEEE Standards Terms, 7th Edition", Published by IEEE Standards Information Network/IEEE Press, Dec. 1, 2000, 3 Pages.

"Non Final Office Action Issued in U.S. Appl. No. 17/202,416", dated Jul. 20, 2021, 16 Pages.

"Non Final Office Action Issued in U.S. Appl. No. 17/202,543", dated Aug. 10, 2021, 15 Pages.

"Non Final Office Action Issued in U.S. Appl. No. 17/202,423", dated Sep. 15, 2021, 21 Pages.

"Notice of Allowance Issued in U.S. Appl. No. 17/202,414", dated Nov. 4, 2021, 12 Pages.

"Non Final Office Action Issued in U.S. Appl. No. 17/202,455", dated Oct. 21, 2021, 23 Pages.

"Handbook for the Palm V Handheld", Published by Palm Inc., 2000, 246 Pages.

Fulton, et al., "Outlook 2010 All-in-One For Dummies", In Publication of Wiley Publishing Inc, Jul. 26, 2010, 940 Pages.

ISPAS, et al., "An Extensible Digital Ink Segmentation and Classification Framework for Natural Notetaking", In Proceedings of the 3rd ACM SIGCHI symposium on Engineering Interactive Computing Systems, Jun. 13, 2011, pp. 231-240.

"Machine Readable Action Symbols", In Publication of ip.com, Jun. 26, 2009, 5 Pages.

Liao, et al., "PapierCraft: A Command System for Interactive Paper", In Proceedings of the 18th Annual ACM Symposium on User Interface Software and Technology, Oct. 23, 2005, pp. 241-244.

"International Search Report and Written Opinion Issued in PCT Application No. PCT/US22/018399", dated Jun. 13, 2022, 10 Pages.

"International Search Report and Written Opinion Issued in PCT Application No. PCT/US22/018402", dated Jun. 14, 2022, 11 Pages.

"International Search Report and Written Opinion Issued in PCT Application No. PCT/US22/018410", dated Jun. 17, 2022, 10 Pages.

"International Search Report and Written Opinion Issued in PCT Application No. PCT/US22/018411", dated Jun. 17, 2022, 9 Pages.

"International Search Report and Written Opinion Issued in PCT Application No. PCT/US22/018815", dated Jun. 15, 2022, 11 Pages.

"International Search Report and Written Opinion Issued in PCT Application No. PCT/US22/018816", dated Jun. 15, 2022, 9 Pages.

Steimle, Jurgen, "Designing Pen-and-Paper User Interfaces for Interaction with Documents", In Proceedings of the Third International Conference on Tangible and Embedded Interaction, Feb. 16, 2009, pp. 197-204.

"Final Office Action Issued in U.S. Appl. No. 17/202,543", dated Feb. 2, 2022, 21 Pages.

Bott, et al., "Microsoft Office Inside Out: 2013 Edition", In Microsoft Press, Jun. 15, 2013, 4 Pages.

"Final Office Action Issued in U.S. Appl. No. 17/202,423", dated Mar. 23, 2022, 24 Pages.

"Notice of Allowance Issued in U.S. Appl. No. 17/202,416", dated Apr. 11, 2022, 7 Pages.

U.S. Appl. No. 17/202,416, filed Mar. 16, 2021.
U.S. Appl. No. 17/202,423, filed Mar. 16, 2021.
U.S. Appl. No. 17/202,543, filed Mar. 16, 2021.

"Notice of Allowance Issued in U.S. Appl. No. 17/202,423", dated Aug. 17, 2022, 5 Pages.

U.S. Pat. No. 11,361,153, Jun. 14, 2022.
U.S. Pat. No. 11,526,659, Dec. 13, 2022.
U.S. Pat. No. 11,372,486, Jun. 28, 2022.

* cited by examiner

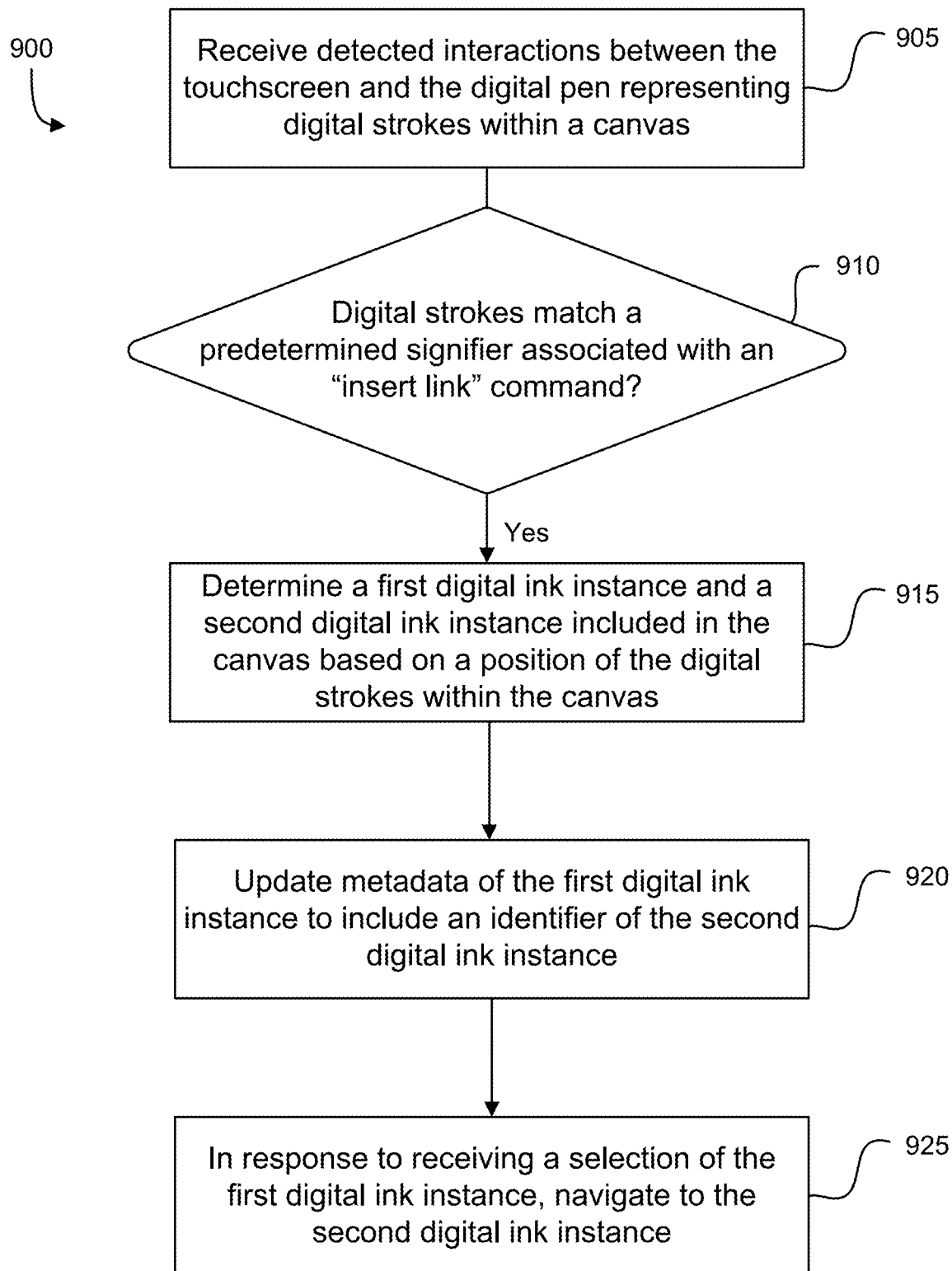

DUPLICATING AND AGGREGATING DIGITAL INK INSTANCES

FIELD

Embodiments described herein provide systems and methods for digital inking and digital ink editing.

SUMMARY

Digital inking allows handwriting and drawings to be added electronically to electronic documents. For example, users can use a pen to perform digital inking within a canvas provided within an electronic document for journaling (e.g., note-taking, generating lists, adding captions or annotations to photos, or the like), planning (e.g., calendaring, goal or habit tracking, to-dos, or the like), and content-creating (e.g., diagramming, mind mapping, storytelling, and the like). This pen can be referred to as a digital pen as it can be used to create digital ink within a canvas. The digital pen can include a passive pen (e.g., a stylus) or an active pen.

Inking applications, which provide a user with a canvas for performing digital inking, also provide tools for editing digital ink. For example, using these tools, a user may delete a word or portion of existing digital ink or may change the position of digital ink within a canvas (e.g., to change the content layout). Modification or editing of digital ink described herein is referred to as digital ink editing and includes changing the physical appearance or location of digital ink or changing other metadata of digital ink, which may not change the physical appearance of the digital ink within the canvas.

Editing digital ink within an inking application often requires a user to switch from an inking mode to an editing mode, which may require the user to switch from using the digital pen on the canvas to using menus or other selection mechanisms or input mechanisms within the inking application to navigate and select an appropriate editing tool. This switching between an inking mode and an editing mode creates inefficiencies. For example, to move digital ink to a new position within the canvas, a user may need to navigate to a menu and select a lasso tool (e.g., using the digital, a cursor-controlled device, a keyboard command, their finger, or the like), use the lasso tool to select digital ink, and then drag the selected digital ink to a new location within the canvas. Subsequently, to continue inking within the canvas, the user must similarly navigate to a menu and select a pen or inking tool or mode. Accordingly, although existing editing tools allow a user to perform digital ink editing, these tools often cause inefficiencies (in terms of user time and computing resources) due to the requirements associated with navigating and selecting editing tools and subsequently returning to an inking mode.

Thus, embodiments described herein provide methods and systems for performing digital ink editing using pen commands, which may invoked using digital ink or other input using the digital pen and without requiring a user to manually switch from an inking mode to a digital ink editing mode. For example, some of the methods and systems described herein translate digital ink received through a canvas to a particular command, such as an editing command. This translation or identification of commands can be based on one or more strokes of the digital ink (e.g., whether one or more strokes match one or more predetermined signifiers associated with a particular command), the context of the digital ink (e.g., other digital ink within the canvas, where the digital ink is added, a sequence or process for how the digital ink was added, etc.), or a combination thereof. The digital ink can represent natural gestures for particular commands. For example, in one embodiment described in more detail below, a user can draw a connecting line between two digital ink instances within a canvas to establish a link (e.g., a hyperlink) between the instances. Accordingly, rather than accessing a "insert link" command or tool from a menu, which may, when selected, provide one or more prompts to the user for establishing a link, a user can use digital ink added to the canvas to invoke the "insert link" command as well as designate what instances should be linked.

As also described in more detail below, some of the methods and systems described herein use input other than digital ink (i.e., digital strokes) provided via the digital pen within the canvas, such as tilt position, hover position, or the like, to invoke a particular command. Again, using input from the digital pen within the canvas to invoke various commands or editing functionality enables a user to efficiently create and manage digital content within a canvas without having to change input modes or access menus or toolbars, which can break the user's focus or otherwise discourage a user from using digital ink.

For example, one embodiment provides a system for linking digital ink instances within an electronic document. The system includes a memory configured to store instructions and an electronic processor coupled to the memory. The electronic processor, through execution of the instructions stored in the memory, is configured to receive detected interactions between a touchscreen and a digital pen representing one or more digital strokes within a canvas and determine whether the one or more digital strokes match a predetermined signifier, the predetermined signifier including a predetermined mark and a line extending from the predetermined mark. The electronic processor is also configured to, in response to determining that the one or more digital strokes match the predetermined signifier, determine a first digital ink instance and a second digital ink instance included in the canvas based on a position of the one or more digital strokes within the canvas and update metadata of the first digital ink instance to include an identifier of the second digital ink instance. The electronic processor is further configured to, in response to receiving a selection of the first digital ink instance within the canvas, navigate to the second digital ink instance within the canvas based on the identifier of the second digital ink instance included in the metadata of the first digital ink instance.

Another embodiment provides a method of linking digital ink instances within an electronic document. The method includes receiving detected interactions between a touchscreen and a digital pen representing one or more digital strokes within a canvas and determining, with an electronic processor, whether the one or more digital strokes match a predetermined signifier, the predetermined signifier including a predetermined mark and a line extending from the predetermined mark. The method also includes, in response to determining that the one or more digital strokes match the predetermined signifier, determining, with the electronic processor, a first digital ink instance and a second digital ink instance included in the canvas based on a position of the one or more digital strokes within the canvas and updating, with the electronic processor, metadata of the first digital ink instance to include an identifier of the second digital ink instance. The method further includes, in response to receiving a selection of the first digital ink instance within the canvas, navigating to the second digital ink instance within the canvas based on the identifier of the second digital ink instance included in the metadata of the first digital ink instance.

A further embodiment provides non-transitory computer readable medium storing instructions that, when executed by an electronic processor, perform a set of functions. The set of functions includes receiving detected interactions between a touchscreen and a digital pen representing one or more digital strokes within a canvas and determining whether the one or more digital strokes match a predetermined signifier, the predetermined signifier including a predetermined mark and a line extending from the predetermined mark. The set of functions also includes, in response to determining that the one or more digital strokes match the predetermined signifier, determining a first digital ink instance and a second digital ink instance included in the canvas based on a position of the one or more digital strokes within the canvas and updating metadata of the first digital ink instance to include an identifier of the second digital ink instance. In addition, the set of functions includes, in response to receiving a selection of the first digital ink instance within the canvas, navigating to the second digital ink instance within the canvas based on the identifier of the second digital ink instance included in the metadata of the first digital ink instance.

Another embodiment provides a system for providing answers to digitally inked questions within an electronic document. The system includes a memory configured to store instructions and an electronic processor coupled to the memory. The electronic processor, through execution of the instructions stored in the memory, is configured to receive detected interactions between a touchscreen and a digital pen representing one or more digital strokes within a canvas and determine whether the one or more digital strokes match a predetermined signifier. The electronic processor is also configured to, in response to determining that the one or more digital strokes match the predetermined signifier, determine a digital ink instance included in the canvas based on a position of the one or more digital strokes within the canvas, extract text from the digital ink instance, submit the extracted text to an answer service as a query, receive a text-based answer to the query from the answer service, convert the text-based answer to digital ink, and add the digital ink to the canvas.

Embodiments described herein also provide a method of providing answers to digitally inked questions within an electronic document. The method includes receiving detected interactions between a touchscreen and a digital pen representing one or more digital strokes within a canvas, and determining, with an electronic processor, whether the one or more digital strokes match a predetermined signifier. The method also includes, in response to determining that the one or more digital strokes match the predetermined signifier, determining, with the electronic processor, a digital ink instance included in the canvas based on a position of the one or more digital strokes within the canvas, extracting, with the electronic processor, text from the digital ink instance, submitting, with the electronic processor, the extracted text to an answer service as a query, receiving, with the electronic processor, a text-based answer to the query from the answer service, converting, with the electronic processor, the text-based answer to digital ink, and adding, with the electronic processor, the digital ink to the canvas.

Yet another embodiment provides non-transitory computer readable medium storing instructions that, when executed by an electronic processor, perform a set of functions. The set of functions includes receiving detected interactions between a touchscreen and a digital pen representing one or more digital strokes within a canvas and determining whether the one or more digital strokes match a predetermined signifier. The set of functions also includes, in response to determining that the one or more digital strokes match the predetermined signifier, determining a digital ink instance included in the canvas based on a position of the one or more digital strokes within the canvas, extracting text from the digital ink instance, submitting the extracted text to an answer service as a query, receiving a text-based answer to the query from the answer service, converting the text-based answer to digital ink, and adding the digital ink to the canvas.

An additional embodiment provides a system for converting text to digital ink. The system includes a memory configured to store instructions and an electronic processor coupled to the memory. The electronic processor, through execution of the instructions stored in the memory, is configured to generate an image of text, trace characters within the generated image to establish a plurality of ink points and a plurality of digital strokes, generate a digital ink instance based on the plurality of ink points and the plurality of digital strokes, and provide the digital ink instance within a user interface.

Another embodiment provides a method of converting text to digital ink. The method includes generating an image of text, tracing characters within the generated image to establish a plurality of ink points and a plurality of digital strokes, generating, with an electronic processor, a digital ink instance based on the plurality of ink points and the plurality of digital strokes, and providing, with the electronic processor, the digital ink instance within a user interface.

A further embodiment provides non-transitory computer readable medium storing instructions that, when executed by an electronic processor, perform a set of functions. The set of functions includes generating an image of text, tracing characters within the generated image to establish a plurality of ink points and a plurality of digital strokes, generating a digital ink instance based on the plurality of ink points and the plurality of digital strokes, and providing the digital ink instance within a user interface.

One embodiment also provides a system for aggregating digital ink instances within an electronic document. The system includes a memory configured to store instructions and an electronic processor coupled to the memory. The electronic processor, through execution of the instructions stored in the memory, is configured to receive detected interactions between a touchscreen and a digital pen representing one or more digital strokes within a canvas and determine whether the one or more digital strokes match a predetermined signifier. The electronic processor is also configured to, in response to determining that the one or more digital strokes match the predetermined signifier, determine a first digital ink instance included in the electronic document based on a position of the one or more digital strokes within the canvas, duplicate the first digital ink instance to create a second digital ink instance, and add the second digital ink instance to a designated portion of the electronic document.

Another embodiment provides a method of aggregating digital ink instances within an electronic document. The method includes receiving, with an electronic processor, detected interactions between a touchscreen and a digital pen representing one or more digital strokes within a canvas and determining, with the electronic processor, whether the one or more digital strokes match a predetermined signifier.

The method also includes, in response to determining that the one or more digital strokes match the predetermined signifier, determining, with the electronic processor, a first digital ink instance included in the electronic document based on a position of the one or more digital strokes within the canvas, duplicating, with the electronic processor, the first digital ink instance to create a second digital ink instance, and adding, with the electronic processor, the second digital ink instance to a designated portion of the electronic document.

Yet another embodiment provides non-transitory computer readable medium storing instructions that, when executed by an electronic processor, perform a set of functions. The set of functions includes receiving detected interactions between a touchscreen and a digital pen representing one or more digital strokes within a canvas and determining whether the one or more digital strokes match a predetermined signifier. The set of functions also includes, in response to determining that the one or more digital strokes match the predetermined signifier, determining, within an electronic document, a first digital ink instance included in the canvas based on a position of the one or more digital strokes within the canvas, wherein the first digital ink instance has a position within the canvas adjacent to the one or more digital strokes in a predetermined direction, duplicating the first digital ink instance to create a second digital ink instance, and adding the second digital ink instance to a designated portion of the electronic document.

Another embodiment provides a system for switching an input mode of a digital pen used with an electronic document. The system includes a memory configured to store instructions and an electronic processor coupled to the memory. The electronic processor, in conjunction with the instructions stored in the memory, is configured to receive a tilt angle of the digital pen while the digital pen is operating in a first input mode, the first input mode being an inking mode, compare the tilt angle of the digital pen to a predetermined threshold associated with a second input mode, and, in response to the tilt angle satisfying the predetermined threshold, setting the input mode of the digital pen to the second input mode.

A further embodiment provides a method for switching an input mode of a digital pen used with an electronic document. The method includes receiving, with an electronic processor, a tilt angle of the digital pen while the digital pen is operating in a first input mode, the first input mode being an inking mode, comparing, with the electronic processor, the tilt angle of the digital pen to a predetermined threshold associated with a second input mode, and, in response to the tilt angle satisfying the predetermined threshold, setting, with the electronic processor, the input mode of the digital pen to the second input mode, the second input mode including a highlighting mode.

Yet another embodiment provides non-transitory computer readable medium storing instructions that, when executed by an electronic processor, perform a set of functions. The set of functions including receiving a tilt angle of a digital pen while the digital pen is operating in a first input mode, the first input mode being an inking mode, comparing the tilt angle of the digital pen to a predetermined threshold associated with a second input mode, and, in response to the tilt angle satisfying the predetermined threshold, setting an input mode of the digital pen to the second input mode, the second input mode including a highlighting mode.

A still further embodiment provides a system for revealing boundaries of a digital ink instance within an electronic document. The system includes a memory configured to store instructions and an electronic processor coupled to the memory. The electronic processor, through execution of the instructions stored in the memory, is configured to receive a hover position of a digital pen over a canvas displayed via a touchscreen, determine whether the hover position of the digital pen is adjacent to a position of the digital ink instance within the canvas; and, in response to the hover position of the digital pen being adjacent to the position of the digital ink instance within the canvas, reveal the boundaries of the digital ink instance within the canvas via a boundary graphic added to the canvas.

Other embodiments also provide a method of revealing boundaries of a digital ink instance within an electronic document. The method includes receiving, with an electronic processor, a hover position of a digital pen over a canvas displayed via a touchscreen and determining, with the electronic processor, whether the hover position of the digital pen is adjacent to a position of the digital ink instance within the canvas. The method also includes, in response to the hover position of the digital pen being adjacent to the position of the digital ink instance within the canvas, revealing, with the electronic processor, the boundaries of the digital ink instance within the canvas via a boundary graphic added to the canvas.

Another embodiment provides non-transitory computer readable medium storing instructions that, when executed by an electronic processor, perform a set of functions. The set of functions includes receiving a hover position of a digital pen over a canvas displayed via a touchscreen and determining whether the hover position of the digital pen is adjacent to a position of a digital ink instance within the canvas. The set of functions also includes, in response to the hover position of the digital pen being adjacent to the position of the digital ink instance within the canvas, revealing boundaries of the digital ink instance within the canvas via a boundary graphic added to the canvas.

Other aspects of the embodiments will become apparent by consideration of the detailed description and accompanying drawings.

BRIEF DESCRIPTION OF THE DRAWINGS

FIG. 5 is a flow chart illustrating a method of linking digital ink instances within a canvas according to some embodiments.

DETAILED DESCRIPTION

Figure 1:
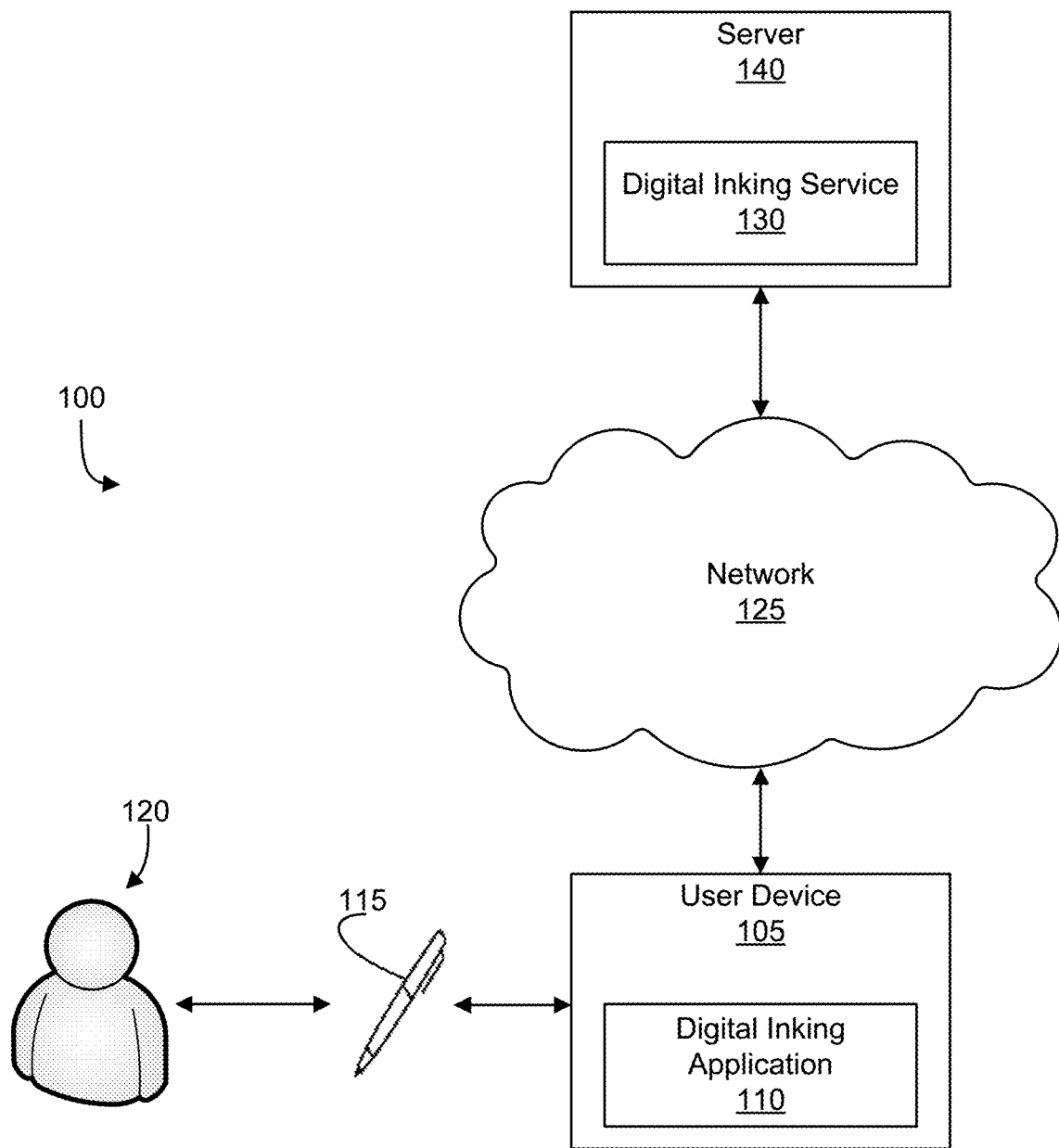
FIG. 1 is a block diagram of a digital inking system according to some embodiments.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

As described above, embodiments described in the present application provide methods and systems for performing digital inking and, in particular, creating and editing digital instance within a canvas using commands invoked in response to received digital ink (i.e., input received while in an inking mode) or other digital pen input, which eliminates or reduces context or mode switching. As will be appreciated from the below description, by using digital ink to invoke particular commands, commands are invoked through more natural gestures than offered by existing inking application. Accordingly, embodiments described herein provide a technical solution that results in improved user interfaces and user experiences within an inking application that also results in reduced or more efficient computing resource usage. In particular, the improved user interfaces and user experiences enable users to stay "in-the-flow" and remain focused on the content being created within a canvas and minimizes distractions and inefficiencies associated with mode switching and using various user interface elements (e.g., menus, tools, buttons, moving to different locations within a canvas) by reducing a number of steps (and, therefore, input that needs processing) needed to executed a particular command. Given the high frequency of many digital ink commands, even small individual efficiencies, fewer context or mode switches, and more natural gestures yield significant aggregate value. The technical effects, therefore, show an improvement in the functioning of computers, particularly those providing inking applications with a canvas for receiving digital ink.

FIG. 1 is a block diagram of a digital inking system 100 according to some embodiments. As illustrated, the system 100 includes a user computing device 105 and a digital pen 115. Non-limiting examples of the user computing device 105 include a laptop computer, a desktop computer, a tablet computer, a mobile telephone, a personal digital assistant (PDA), a mobile email device, or another electronic device configured to perform digital inking or digital ink editing. As illustrated in FIG. 1, the user device 105 receives input from the digital pen 115 as operated or controlled by a user 120. The digital pen 115 can include a passive pen (e.g., a stylus) or an active pen.

The user device 105 includes a digital inking application 110. The digital inking application 110 provides, within an electronic document, such as, for example, a digital journal, a canvas configured to receive digital ink via the digital pen 115. In some embodiments, the digital inking application 110 is a stand-alone application executed by the user device 105 (an electronic processor included in the user device 105) to provide the digital inking and digital ink editing functionality described herein. In other embodiments, however, the digital inking application 110 may access or otherwise communicate with a digital inking service 130 provided by a server 140, which may provide one or more hosted services. In this embodiment, the user device 105 is connected to a network 125 to communicate with the server 140.

The network 125 can include wired networks, wireless networks, or a combination thereof that enable communications between the various entities in the system 100. In some configurations, the communication network 125 includes cable networks, the Internet, local area networks (LANs), wide area networks (WAN), mobile telephone networks (MTNs), and other types of networks, possibly used in conjunction with one another, to facilitate communication between the user device 105 and the server 140.

In embodiments where the digital inking application 110 communicates with the digital inking service 130, the digital inking application 110 installed on the user device 105 may be a general purpose browser application configured to access various services and content over the network 125, including the digital inking service 130 provided by the server 140. Alternatively, in this embodiment, the digital inking application 110 installed on the user device 105 may be a dedicated application configured to access the digital inking service 130. Also, it should be understood that the functionality described herein as being performed by the digital inking application may be performed by the user device 105, the server 140, or a combination thereof where functionality may be distributed in various manners.

It should also be understood that the system 100 illustrated in FIG. 1 is provided by way of example and the system 100 may include additional or fewer components and may combine components and divide one or more components into additional components. For example, the system 100 may include any number of user devices 105 or networks 125 and various intermediary devices may exist between a user device 105 and the server 140. Also, in some embodiments, multiple servers 140 may be used to provide the digital inking service 130, such as within a cloud computing environment.

Figure 2:
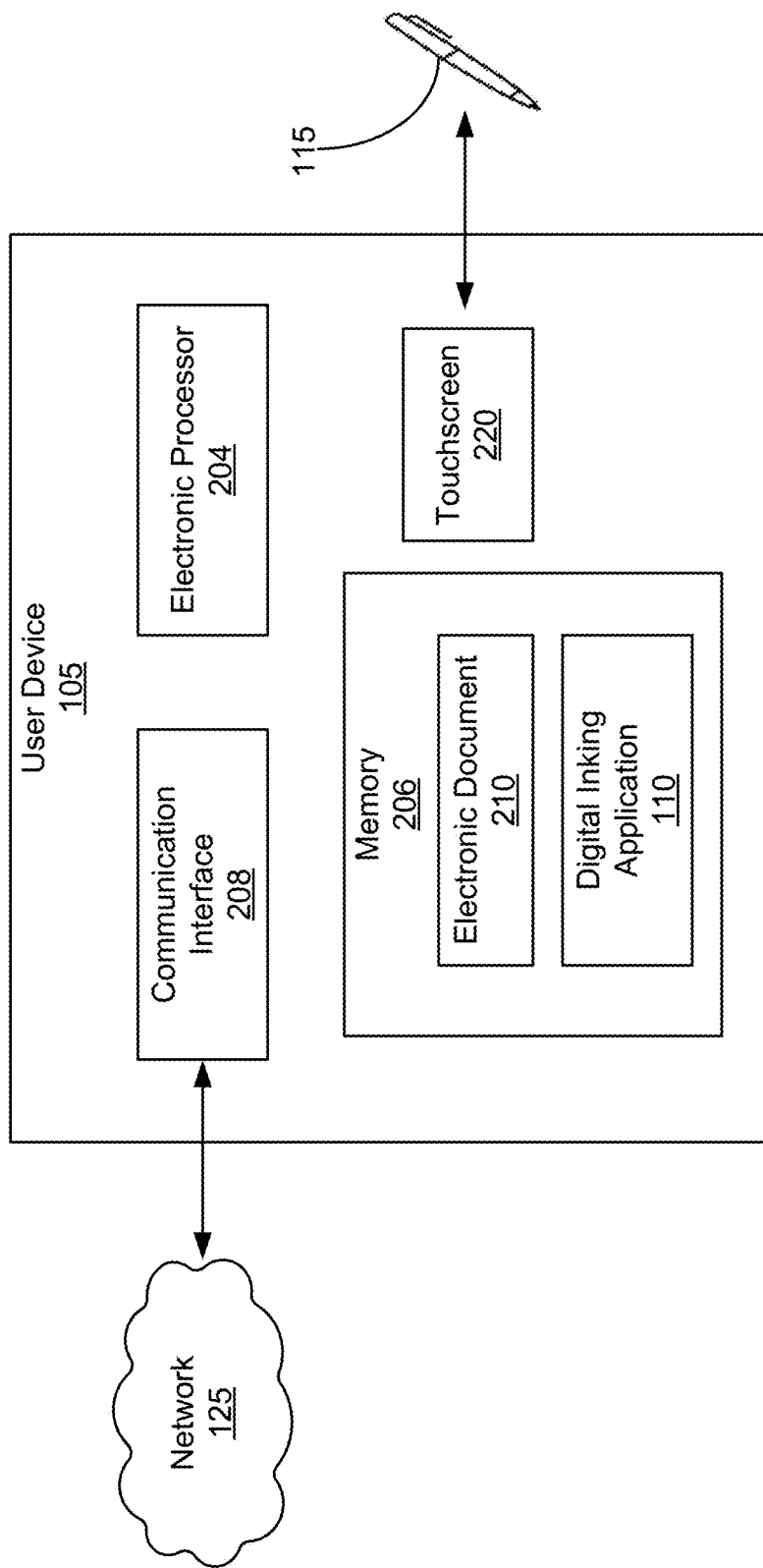
FIG. 2 is a block diagram of a user device and a digital pen included in the digital inking system of FIG. 1 according to some embodiments.

As illustrated in FIG. 2, the user device 105 includes an electronic processor 204, a computer-readable memory 206, and a communication interface 208. The electronic processor 204, memory 206, and communication interface 208 communicate wirelessly, over one or more wired communication channels or busses, or a combination thereof (not illustrated). The memory 206 can include non-transitory memory, such as random access memory, read-only memory, or a combination thereof. The electronic processor 204 can include a microprocessor, a microcontroller, a digital signal processor, or any combination thereof configured to execute instructions stored in the memory 206. The memory 206 can also store data used with and generated by execution of the instructions. The communication interface 208 allows the user device 105 to communicate with external networks and devices, including, for example, the network 125. For example, the communication interface 208 may include a wireless transceiver for communicating with the network 125. It should be understood that the user device 105 may include additional or fewer components than those illustrated in FIG. 2 and may include components in various configurations. For example, in some embodiments, the user device 105 includes a plurality of electronic processors, a plurality of memories, a plurality of communication interfaces, or a combination thereof. Also, in some embodiments, the user device 105 includes additional input devices, output devices, or a combination thereof.

As illustrated in FIG. 2, the memory 206 stores the digital inking application 110. The digital inking application 110 (as executed by the electronic processor 204) provides a canvas (e.g., a digital journal) for receiving, displaying, and editing digital ink, including the editing functionality described below. In some embodiments, the memory 206 also stores one or more electronic documents 210, such as one or more digital journals generated via the digital inking application 110. In some embodiments, the electronic documents 210 may be stored in separate memory included in the user device 105, in a memory external to the user device 105 but accessible by the user device 105 (e.g., via the communication interface 208 or a dedicated port or interface), or in a combination thereof.

It should be understood that when the digital inking application 110 described herein is used in a networked environment with the server 140, each of the server 140 may include similar components as the user device 105 and, in particular, may include one or more electronic processors for executing applications or instructions that, when executed, provide the digital inking service 130.

As illustrated in FIG. 2, the user device 105 also includes (or communicates with) a touchscreen 220. The digital inking application 110 (or a separate application or module) is configured to detect when the digital pen 115 touches or otherwise interacts with the touchscreen 220 (e.g., using capacitive technology). These detected positions can be translated to ink points and digital strokes via the digital inking application 110, which can be used to generate and add digital ink to the canvas. As noted above, in some embodiments, the digital pen 115 includes a passive pen. However, in other embodiments, the digital pen 115 includes an active pen. An active pen, as compared to a passive pen, includes electronics or circuitry configured to communicate with a digitizer included in the touchscreen 220. This communication allows the digital inking application 110 to provide additional functionality as compared to when the digital pen 115 includes a passive pen. For example, when the digital pen 115 is an active pen, the digital inking application 110 can provide functionality that uses or is responsive to pressure or touch sensitivity applied by the pen 115, a tilt of the pen 115, a position of the pen 115 (such as a position of the pen even when the pen is hovering over but not touching the touchscreen 220), activation of input mechanisms (e.g., buttons) on the pen 115, use of an eraser tip of the pen 115, or the like.

As described above, the digital inking application 110 (as executed by the one or more electronic processors 204) provides a canvas within an electronic document (e.g., as part of a digital journal) and is configured to detect digital strokes input via the digital pen 115 and process the digital strokes to generate, add, and edit digital ink within the canvas.

Figure 3:
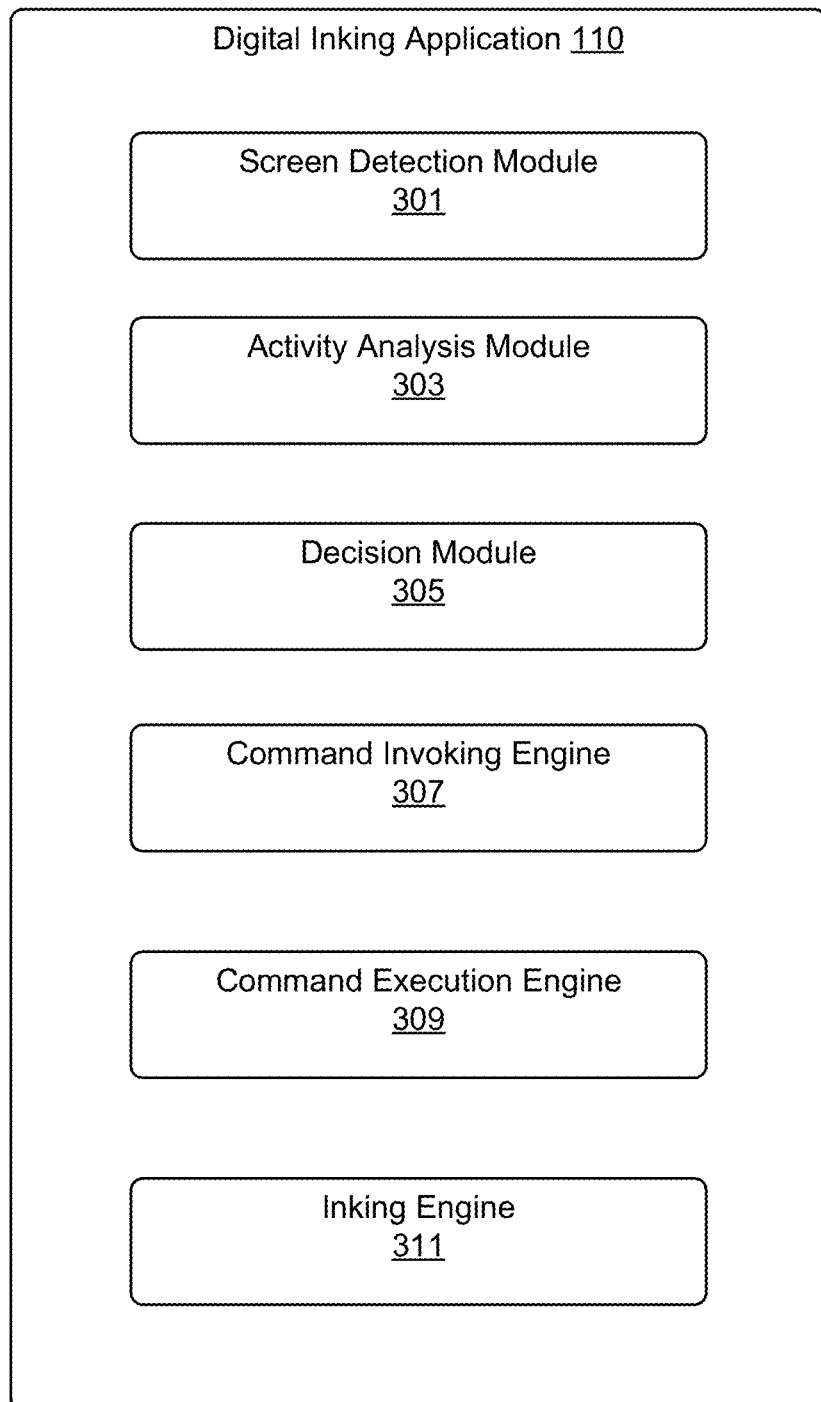
FIG. 3 is a block diagram of components included in a digital inking application provided via the digital inking system of FIG. 1 according to some embodiments.

FIG. 3 is a block diagram of example components of the digital inking application 110 according to some embodiments. As illustrated, the digital inking application 110 may include a screen detection module 301, an activity analysis module 303, a decision module 305, a command invoking engine 307, a command execution engine 309, and, optionally, an inking engine 311. The modules and engines described herein with respect to FIG. 3 represent instructions stored in one or more memories (e.g., the memory 206) executable by the electronic processor 204 to perform the functionality described herein. It should be understood that the functionality described herein can be performed by various configurations of modules, engines, or applications and the particular configuration illustrated in FIG. 3 and described herein is provided merely as one example. For example, in some embodiments, functionality described as being performed by multiple modules may be performed by a single module or functionality described as being performed by one module may be distributed between two or more modules. Similarly, it should be understood that when digital inking is provided within a networked environment with the server 140, the digital inking service 130 may include similar components as the application 110. Also, in some embodiments, the digital inking application 110 may provide additional functionality not described herein.

The screen detection module 301 detects activities implemented on the touchscreen 220, which displays an electronic document including canvas for receiving digital ink (as generated by the digital inking application 110). The canvas defines an area of a user interface for receiving and displaying digital ink, and the activities detected by the screen detection module 301 includes interactions between the touchscreen 220 and the digital pen 115. In some embodiments, the screen detection module 301 also detects other types of activities or input associated with the digital pen 115, such as a position of the digital pen 115 regardless of whether the digital pen 115 is touching or otherwise interacting with the touchscreen 220. Also, in some embodiments, the screen detection module 310 detects activities implemented on the touchscreen 220 via a user's finger, via a cursor-controlled device, or via other input devices or mechanisms.

The activity analysis module 303 analyzes the activities detected by the screen detection module 301 to determine, for example, what type of input was received, where the input was received within the canvas, and other parameters of the input. For example, the activity analysis module 303 can be configured to analyze locations of interactions between the digital pen 115 and the touchscreen (as detected via the screen detection module 301) as a group of ink points defining a group of digital strokes, which may define a particular pen-related operation (also referred to as a "gesture"). The activity analysis module 303 can analyze the activities in the current context or state of the canvas.

The decision module 305 decides whether to invoke a pen command based on the activity analysis. For example, the decision module 305 may determine that a pen command is triggered in response to one or more digital strokes input via the digital pen 115 matching a predetermined signifier associated with a particular command. In some embodiments, detected pen activity that includes digital ink (i.e., detected digital strokes) can initially be referred to as "wet ink," which is processed to determine whether the input represents a pen command. "Wet ink" can be displayed with the canvas but, may, in some embodiments, be removed from the canvas when the digital ink is determined to be a pen command. Digital ink determined not to be a pen command is retained in the canvas and referred to as "dry ink."

The command invoking engine 307 invokes a pen command based on the decision made by the decision module 305. For example, in response to the decision module 305 determining that a pen command has been triggered, the command invoking engine 307 may invoke the associated pen command. The associated pen command may involve changing a mode of the pen 115 (e.g., from a digital inking mode to an edit mode) or directly editing existing digital ink included in the canvas. In some embodiments, after a pen command is invoked, the content on the touchscreen 220 may be further manipulated as part of the pen command and this manipulation may be monitored and handled by the command execution engine 309.

In some implementations, the digital inking application 110 also includes an inking engine 311. The inking engine 311 may be configured to perform general inking activities other than a pen command and, in some embodiments, may be configured to add or render digital ink within the canvas.

As noted above, the screen detection module 301 may be configured to detect digital ink strokes applied on the touchscreen 220 as well as certain no-stroke pen activities. In some implementations, the screen detection module 301 may include a canvas event tracking component that tracks activities applied on the touchscreen 220 (i.e., the canvas) by the digital pen 115. For example, the screen detection module 301 may detect that a user is moving digital content displayed on the touchscreen 220. In particular, the screen detection module 301 may detect that the digital pen 115 is touching one point of the touchscreen 220 and being moved (e.g., dragged) in a particular direction. In another example, the screen detection module 301 may detect movement of a scroll bar or detect digital strokes (e.g., representing new digital ink content or representing a pen command as described below).

In some implementations, the screen detection module 301 may include a location identification component to identify a location (e.g., a most recent location) where an ink point or stroke was applied on the touchscreen 220 (e.g., within the displayed canvas). For example, as noted above, when the digital pen 115 includes an active pen or stylus, the location identification component may collect location information from a digitizer of the user device 105, where the digitizer may use a capacitance technique to sense the location of the digital pen 115. Alternatively or in addition, in some embodiments, one or more cameras of the user device 105 can be configured to detect the position of the digital pen 115. The cameras can optionally include a depth camera system that uses a time-of-flight technique, a structured light technique, a stereoscopic technique, or the like, to capture a depth image of the user's hand, the digital pen 115, or both. Alternatively or in addition, an inertial measurement unit (IMU) associated with the digital pen 115 can detect the position of the digital pen 115, and, by extension, the position of the hand that holds the digital pen 115. The IMU can include any combination of one or more accelerometers, gyroscopes, magnetometers, or the like. It should be understood that other techniques for detecting the location of the user's hand, the digital pen 115, or both may be used. However, regardless of the technique used to detect the user's hand, the digital pen 115, or both, location information of the digital pen 115 and the performed gesture may be identified. In some implementations, the location information may be compared with the existing ink (i.e., contents such as texts, tables, charts, images, etc.) to determine where the strokes or gestures have been applied with respect to the content. Similarly, characteristics of the digital ink (e.g., shape, size, etc.) may be compared with predetermined signifiers to detect pen commands as described herein. For example, the digital inking application 110 may access one or more stored rules that associate particular signifiers with particular commands. The signifiers may define particular digital strokes (e.g., marks (symbols, shapes, etc.) or lines) and, optionally, particular timing or sequences of such strokes. Thus, detected strokes can be compared to the stored rules to identify whether the detected strokes represent new digital ink to be added to the canvas as content or whether the detected strokes are triggering a particular command.

In some implementations, the screen detection module 301 also include a pressure determination component to determine the pressure applied to the surface of the touchscreen 220 from the digital pen 115. In some implementations, the pressure determination component may communicate with the digital pen 115 to collect the pressure information. For example, the digital pen 115 may be an active pen that includes an electronic component for registering the pressure at which the user presses a pen tip against the surface of the touchscreen 220 at each moment. For example, a tip displacement sensor may register the force with which the user applies the digital pen 115 against the surface of the digitizer. The digital pen 115 may also include a transmitter that forwards the pressure information to the user device 105 (e.g., to the pressure determination component in the screen detection module 301). In some implementations, the user device 105 may itself include a sensor that measures and determines how much pressure is being exerted on the touchscreen 220. For example, zinc oxide (ZnO)-based thin-film transistor (TFT) sensors can be integrated with existing commercial integrated circuits (ICs) widely used to control touchscreens and provide pressure information. In some implementations, the screen detection module 301 may detect other information during an inking or ink editing process. Similar to how pressure information can be transmitted to the user device 105, in some embodiments, the digital pen 115 is also configured to transmit other data to the user device 105, such as, for example, a tilt angle of the pen 115 and a hover position of the pen 115, which may be detected or determined by the pen 115 using internal electronics or circuitry. Alternatively or in addition, the user device 105 (and the digital inking application 110) can be configured to detect this positional information regarding the digital pen 115 directly.

As noted above, the activity analysis module 303 analyzes detected pen activities. For example, in response to detection of a pen activity, the activity analysis module 303 may analyze location information with respect to existing digital ink in the canvas and other relevant information. For example, in some embodiments, a Document Object Model (DOM) or similar data structure defines a current state of an electronic document, such as an electronic journal. For example, the DOM can define one or more pages included in an electronic document, wherein each page includes one or more paragraphs (including one or more lines and one or more words), one or more drawings, or a combination thereof. A paragraph and a drawing are both represented within the DOM structure as including a group of digital strokes, which includes a set of ink points and position information for the set of ink points within the page. In some embodiments, a group of digital strokes can be associated with more than one set of position information. For example, digital ink can be duplicated within an electronic document and each copy may reference the same set of ink points but different position information. In some embodiments, the position information also includes formatting information, such as color, size, etc. However, in other embodiments, this data can be stored as separate metadata within the DOM. Accordingly, a particular digital ink instance included in an electronic document (e.g., whether including one or more paragraphs or a drawing) is defined within the DOM as a set of digital strokes, which include a set of ink points located at a particular position within a page. The DOM may also include other metadata for digital ink, such as, for example, an identifier of other digital ink or content linked with the digital ink, a type of the digital ink, or the like. Accordingly, using the current state of the electronic document currently provided within the canvas, the activity analysis module 303 can determine an intent of detected pen activity.

As one example, based on the location information for detected pen activity, the activity analysis module 303 may determine where a digital stroke is applied by the pen 115. For example, in response receiving digital ink input representing a vertical line, the shape and location of the vertical line may be identified and, based on the identified location information, combined with location the existing digital ink, the activity analysis module 303 may determine whether the vertical line is drawn between words, at the end of a line, at the beginning of a line, at the end of multiple lines, at the beginning of multiple lines, etc. As another example, in response to receiving digital ink input representing a circle, based on the location information of the circle, the activity analysis module 303 may determine whether any existing digital content is located within the circle (e.g., overlaps positioning with the circle). For example, the activity analysis module 303 may determine that one or more words, an image, an equation, a table, etc., is located within (e.g., fully or partially within) the circle. The decision module 305 receives the results of the analysis performed by the activity analysis module 303 as input and decides whether to invoke a pen command and, in applicable what pen command to invoke.

In some embodiments, the activity analysis module, the decision module 305, or both apply various rules or thresholds to detected pen activity to process the activity, such as using predetermined signifiers associated with particular commands as described. These rules or thresholds may be default rules or thresholds or, alternatively, may be user-specific, user device-specific, pen-specific, or a combination thereof. For example, in some embodiments, the digital inking application 110 includes a learning component that can be trained to understand what pen activity is associated with a particular pen command. For example, for tilt related commands, the learning component may detect one or more tilt positions of the pen 115 (in response to a prompt to a user to tilt the pen 115 to provide a reference angle) to learn a threshold amount of tilt the user desires to use for a pen command requiring a predetermined tilt angle. In some implementations, the activity analysis module 303, the decision module 305, or both may collect identifying information from the user device 105, the pen 115, the user, or a combination thereof to apply appropriate rules or thresholds. The identifying information may include a MAC address of the user device 105, biometric or log-in information of the user, a hardware or software identifier of the pen 115, or a combination thereof. For example, in some embodiments, when the digital pen 115 is an active pen, a transmitter of the pen 115 may transmit a pen identifier to the user device 105.

In some implementations, in addition to determining whether detected pen activity represents new content or a pen command, the decision module 305 also determines one or more pen commands to invoke. At this point, the decision module 305 may check the context of pen activity applied to the touchscreen 220. For example, the decision module 305 may check previous strokes or the relationship of the activity with respect to existing digital ink within the canvas. For example, the decision module 305 may use a shape recognizer to identify the specific shape of a stroke (e.g., a vertical line, a horizontal line, a circle, a drag, etc.). As one example, the decision module 305 may find that the preceding stroke is a circle stroke drawn around existing words, an image, a table, etc., included in the canvas.

The command invoking engine 307 may be configured to invoke a pen command according to the decision made by the decision module 305. By invoking a pen command, certain digital content may become interactive with the pen 115, and, thus, allow the digital pen to manipulate the relevant content without requiring that the user navigate to particular tools or menus at the designated location of the screen or canvas. That is, once a pen command is invoked, the digital content related to the pen command may become active for ink editing by the digital pen 115.

In some embodiments, the digital inking application 110 includes multiple command invoking engines, wherein each engine is associated with a particular pen command. In this respect, one or more command invoking engines can register with the decision module 305, which allows functionality of the digital inking application 110 to be expanded, updated, repaired, or the like. In this configuration, the decision module 305 determines the intent of the detected pen activity and invokes one or more command invoking engines to respond to the detected intent. Each command invoking engine is configured to receive input from the decision module 305 and invoke a particular pen command. In some embodiments, a command invoking engine may access or communicate with one or more services to invoke a pen command. These services can include, for example, an ink analysis service, file system service, a clipboard service, one or more APIs, or an instant answer or search engine service, such as the Bing® Instant Answers service provided by Microsoft Corporation. Using these services allows the digital inking application 110 to delegate functionality to other services or platforms, which simplifies the configuration and programming of the digital inking application 110.

The command execution engine 309 may be configured to execute certain ink editing related to an invoked pen command. In some implementations, after a pen command is invoked, different ink editing processes may be then executed through the invoked pen command. For example, when pen activity is detected as invoking a highlighting command (described in more detail below), the command execution engine 309 may be configured to monitor stroke input via the pen 115 and applying highlighting accordingly. In some embodiments, the command execution engine 309 may be combined with the command invoking engine 307. Also, in some embodiments, a command execution engine 309 may not be used for particular pen commands. For example, in some embodiments, when a particular pen command is invoked, no further monitoring of input is needed as the pen command is invoked and subsequent input is processed as new input as described above.

As described below, the digital inking application 110 (and the components described above with respect to FIG. 3) is configured to provide digital ink editing functionality triggered based on received digital ink or other pen input or activity as compared to requiring that the user navigate to a particular menu or tool, switch the digital pen 115 to a different mode, or the like. Examples of this digital ink editing functionality are provided below. It should be understood that the digital inking application 110 may provide any one or more of the below examples in various combinations.

Linking Digital Ink Instances

The default reading order for notes or other content in a journal is often defined by the physical location of content within a page and the order of the pages. However, in many cases, this is not the optimal way to traverse notes. For example, users may take notes over time in a sequential manner. In this situation, if a user takes notes on one day regarding a particular topic and a few days later takes additional notes on the same topic, the notes in the digital journal may be separated by unrelated notes and may even be separated by one or more pages.

Traditional paper-based journals do not allow a user to easily reorder notes. A digital journal, however, may more easily allow a user to reorder notes, such as by selecting and repositioning individual notes. This manual repositioning, however, can be time-consuming and may result in loss of data (e.g., as the digital journal is no longer in date order).

Accordingly, to solve these and other issues, the digital inking application 110 can be configured to establish a link between digital ink instances (i.e., dry ink instances) in response to receiving digital ink drawing a connecting line between the digital ink instances. In particular, in response to receiving digital ink matching a predetermined signifier (or a sequence of signifiers), the digital inking application 110 is configured to invoke an "insert link" command that updates metadata of one or both of the digital ink instances with an identifier of the other instance (e.g., a hyperlink), which makes the digital ink instances active or otherwise selectable to navigate through linked content within a canvas, such as a digital journal. Thus, a user can use natural gestures provided through digital ink added to the canvas to link content within a journal without having to navigate or select an insertion tool from a menu and then define or create the desired link within a dedicated user interface or prompt, which creates inefficiencies from both a user perspective and a computing resources perspective.

Figure 4:
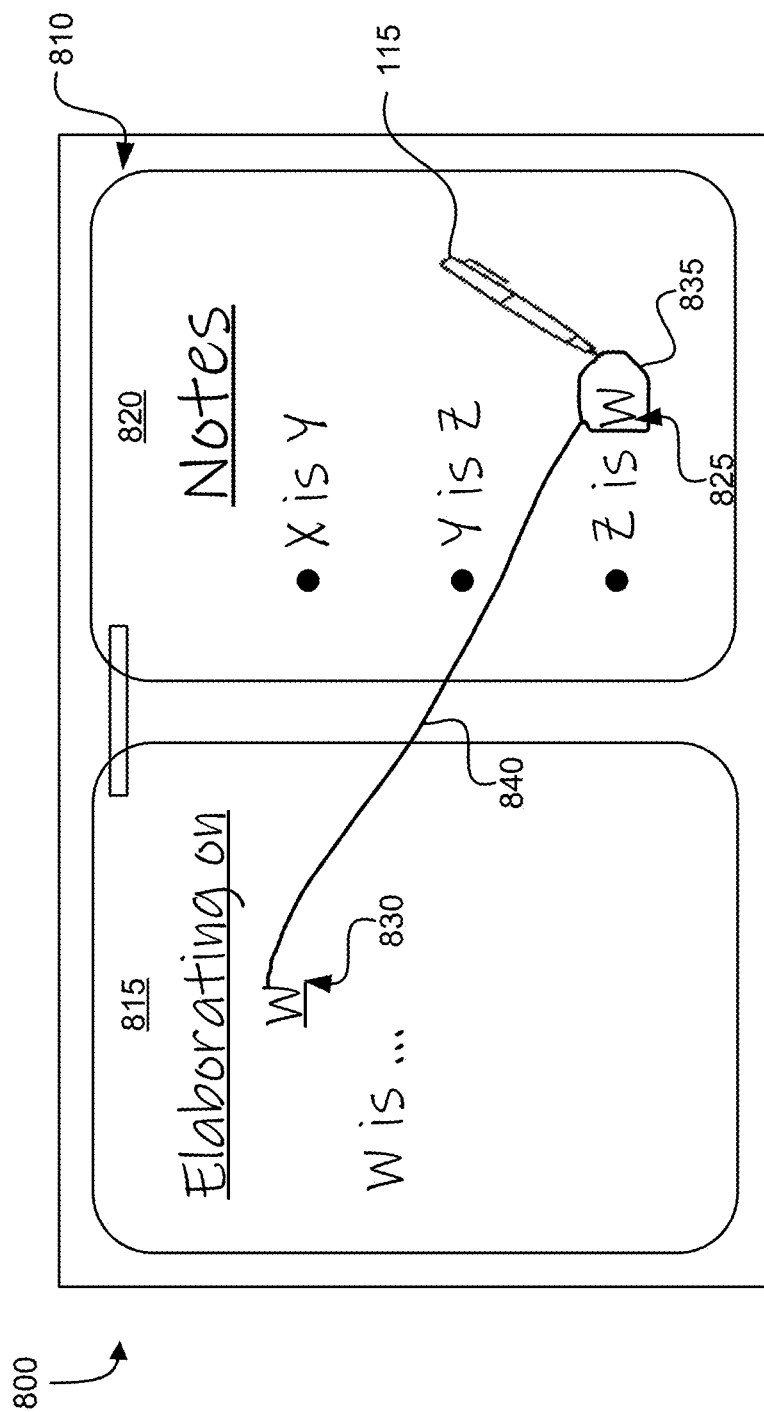
FIG. 4 illustrates a user interface provided by the digital inking application including digital ink invoking a "link" command according to some embodiments.

For example, FIG. 4 illustrates a user interface 800 provided via the digital inking application 110. The user interface 800 includes two pages 815 and 820 of an electronic document (e.g., a digital journal) within a canvas 810. The page 820 includes a first digital ink instance 825 including the letter "w," and the page 815 includes a second digital ink instance 830 including the words "Elaborating on w." As illustrated in FIG. 4, to establish a link between the first digital ink instance 825 and the second digital ink instance 830, a user can mark and connect the first digital ink instance 825 and the second digital ink instance 830 using digital ink including or matching a predetermined signifier. In some embodiments, the predetermined signifier includes a mark 835 having a predetermined shape or format (e.g., circling all or a predetermined portion of the first digital ink instance 825, adding a bounding box around all or a predetermined portion of the first digital ink instance 825, or the like acting as a first signifier) and a line 840 (acting as a second signifier) extending from the mark 835 that connects the marked first digital ink instance 825 and the second digital ink instance 830. In some embodiments, the user marks the second digital ink instance 830 using an end of the connecting line 840. However, in other embodiments, the user marks the second digital ink instance 830 by marking the instance 830 similar to how the user marked the first digital ink instance 825 (e.g., by circling all or a portion of the second digital ink instance 830). In some embodiments, the predetermined signifier includes the predetermined mark 835 and the connecting line 840 within a continuous digital stroke. However, in other embodiments, the predetermined signifier may be received as a set of one or more discrete strokes.

In response to the digital inking application 110 detecting the digital ink including the predetermined signifier, the digital inking application 110 invokes the "insert link" command, which causes the digital inking application 110 to determine the first and second digital ink instances 825 and 830 based on the position of the analyzed digital strokes (e.g., the mark 835 and the connecting line 840) within the canvas 810 and update metadata of the first digital ink instance 825, the second digital ink instance 830, or both with an identifier of the other instance. In some embodiments, the digital inking application 110 also removes the digital ink (i.e., the mark 835 and the connecting line 840) that triggered the "insert link" command from the canvas 810 (as this digital ink was determined to be pen command rather than dry ink).

With the link established, the first digital ink instance 825 can be active or selectable within the canvas 810 wherein, in response to receiving a selection or tap of the first digital ink instance 825, the digital inking application 110 navigates to or otherwise scrolls the canvas such that the second digital ink instance 830 is included within the user interface 800. In some embodiments, the link is bi-directional such that the second digital ink instance 830 can also be active or selectable to navigate to the first digital ink instance 825. It should be understood that the first and second digital ink instances 825 and 830 can include any type of content, e.g., words, paragraphs, drawings, images, symbols, etc. Also, the first and second digital ink instances 825 and 830 may be included on the same page of the digital journal or may be separated by multiple pages. Also, in some embodiments, the first and second digital ink instances may be included in separate journals (included within the same canvases or separate canvases). Also, in some embodiments, active or selectable digital ink may be provided within the canvas in a particular format or associated with an icon or other mark that alerts the user that the ink is active and can be selected.

FIG. 5 is a flow chart illustrating a method 900 of linking digital ink instances. The method 900 is described as being performed by the digital inking application 110 (and the components described above with respect to FIG. 3) as executed by the electronic processor 204 of the user device 105. However, as noted above, in some embodiments, the method 900 or portions thereof may be performed by the digital inking service 130 provided via the server 140.

As illustrated in FIG. 5, the method 900 includes receiving detected interactions between the touchscreen 220 and the digital pen 115 representing one or more digital strokes within a canvas displayed via the touchscreen 220 (at block 905). The digital inking application 110 analyzes the digital strokes to detect whether the digital strokes match a predetermined signifier associated with an "insert link" command (at block 910). As used in the present application, digital strokes match a particular predetermined signifier when the digital strokes include one or more strokes matching a shape, size, pattern, or timing of the predetermined signifier. As described above, in some embodiments, the predetermined signifier associated with an "insert link" command includes a predetermined mark, such as a circle, a rectangle, a triangle, or another predetermined shape, and a line extending from the predetermined mark, wherein, optionally, the predetermined mark and the line are included in a continuous stroke.

In response to detecting that the digital strokes match the predetermined signifier, the digital inking application 110 invokes an "insert link" command and determines a first digital ink instance and a second digital ink instance within the canvas based on a position of the digital strokes (at block 915). For example, to determine the first digital ink instance, the digital inking application 110 can use the state of the electronic document provided within the canvas (as defined by the DOM) to determine existing digital ink positioned adjacent to the predetermined mark. In particular, when the predetermined mark is a circle or other shape drawn around existing digital ink, digital ink positioned adjacent to the predetermined mark can include digital ink including a threshold amount of digital strokes or ink points positioned in an area of the canvas within the predetermined mark or otherwise overlapping with the predetermined mark. In other embodiments where the predetermined mark is a shape drawn next to existing digital ink, digital ink positioned adjacent to the predetermined mark includes digital ink including one or more digital strokes or ink points positioned within a predetermined distance of digital strokes or ink points of the predetermined mark. For example, if the predetermined mark is a star, the digital inking application 110 may determine existing digital ink having ink points closest to ink points of the star. Accordingly, as used in the present application, digital ink "adjacent" to a predetermined signifier is determined by comparing positions of existing digital ink with positions of the predetermined signifier and identifying digital ink including (e.g., the most) digital strokes or ink points closest to, contained within, or overlapping with positions of the predetermined signifier. In situations where no digital ink can be established as being adjacent (e.g., no existing digital ink is within the predetermined distances or thresholds to be considered adjacent to the predetermined mark), the entire page and, optionally, all digital ink instances within the page, can be set as the first digital ink instance. Similarly, when more than one digital ink instance satisfies the thresholds or distances to be considered "adjustment" to the predetermined mark, the set of instances can be set as the first digital ink instance or the digital ink instance closest to or having the most overlapping position with the predetermined mark may be set as the first digital ink instance.

Similarly, to determine the second digital ink instance, the digital inking application 110 can use the state of the electronic document provided within the canvas to determine existing digital ink positioned adjacent to an ending position of the line extending from the predetermined mark. Alternatively, if another predetermined mark is used at the end of the line, the digital inking application 110 can use a position of this additional predetermined mark to determine the second digital ink instance as described above for the first digital ink instance. As noted above, in some embodiments, if no digital ink can be established as being adjacent (e.g., no existing digital ink is within the predetermined distances or thresholds to be considered adjacent to the end of the line extending from the predetermined mark), the entire page and, optionally, all digital ink instances within the page, can be set as the second digital ink instance.

Similarly, when more than one digital ink instance satisfies the thresholds or distances to be considered "adjacent" to the end of the connecting line, the set of instances can be set as the second digital ink instance or the digital ink instance being closest or having the largest overlapping position with the end of the connecting line can set as the second digital ink instance.

After determining the first and second digital ink instances (at block 915), the digital inking application 110 updates metadata of the first digital ink instance to include an identifier of the second ink instance (at block 920). In some embodiments, the identifier includes a hyperlink or other type of pointer or link to the second ink instance. As noted above, in some embodiments, a bi-directional link is established between the first and second digital ink instances by also updating the metadata of the second digital ink instance to include an identifier of the first ink instance. Also, in some embodiments, digital ink instances including a link to other content, such as another digital ink instance, is considered "active" and marked or formatted within the canvas to distinguish the digital ink instance from inactive content. For example, "active" digital ink instances may be provided with underlining, in a particular color, or with a particular icon or animation that designates the instance as being active. As illustrated in FIG. 5, in response to receiving a selection of the first digital ink instance, such as, for example, a click or tap of the first digital ink instance, hovering the digital pen 115 above the first digital ink instance, or the like (at block 925), the digital inking application 110 navigates the journal to the linked second digital ink instance within the canvas (i.e., updating the canvas to include the second digital ink instance).

Thus, the link (established through the predetermined mark and associated connecting line drawn via digital ink) enables a user to easily navigate digital ink content within an electronic document, such as a digital journal, which may include many pages and disjointed content. These links can also be used to leverage organization or understanding of the content, such as by using the links as part of performing keyword searching within the document. In addition, in existing applications, links usually point to navigation constructs (e.g., pages). Thus, the underlying expectation is that the content is static and the link might be "broken" if the user rearranges or adds content. However, as the link described herein is between digital ink instances, which can be defined at various levels of granularity, the link points to user content rather than navigation constructs and the digital inking application 110 is responsible for choosing the right navigation action when a link is activated. Accordingly, as user-generated content evolves, previously generated links still work correct. For example, if a user creates a link to a paragraph on page 1 of a digital journal but subsequently extracts words from this paragraph to page 2 and eventually moves the entire paragraph to page 3, the link will still work as the user intended and, in particular, the journal will navigate to page 3 when the link is selected.

Also, because the link is established through digital ink and, in particular, natural gestures (i.e., drawing a connecting line), the user is not required to learn or know any mark-up languages, retrieve any type of URL or identifier of content as a separate step (e.g., a page name, a page URL, or the like), remember any identifier of target or linked content, or invoke any type of user interface or process that prompts the user to choose target or linked content. Instead, the user only needs to draw a visual representation of the link within the canvas, such as by circling content that will become a link and pointing to the target of the link via a connecting line. Thus, the user's "flow" is not broken, and the user can naturally express the desired source and target for a link.

Question and Answer with Digital Ink

While working within an electronic document including a canvas for digital ink (e.g., an electronic journal), a user may have a question or need supporting information from one or more external sources. Traditionally, to answer this question, the user must navigate out of the electronic document and access a search engine or other on-line or local service or resource to input a question and receive an answer. The user then has to return to the electronic document and manually add the retrieved answer to the electronic document. This navigation outside of the electronic document clearly creates inefficiencies and also relies on the user to correctly remember or understand the answer and add the answer to the electronic document. Furthermore, even if a user can copy the answer and paste the answer into the electronic document, this pasting modifies the organization and structure of the electronic document that may otherwise primarily include digital ink.

Accordingly, to solve these and other issues, in response to detecting digital ink as being a pen command associated with a "question" command, the digital inking application 110 can be configured to extract text from digital ink marked as a question within the canvas, send a query to an answer service, such as the Bing® Instant Answer Service provided by Microsoft Corporation, receive a result from the answer service, and add the result to the canvas as digital ink (not text), which allows the result to be moved and modified as other digital ink within he canvas.

Figure 6A:
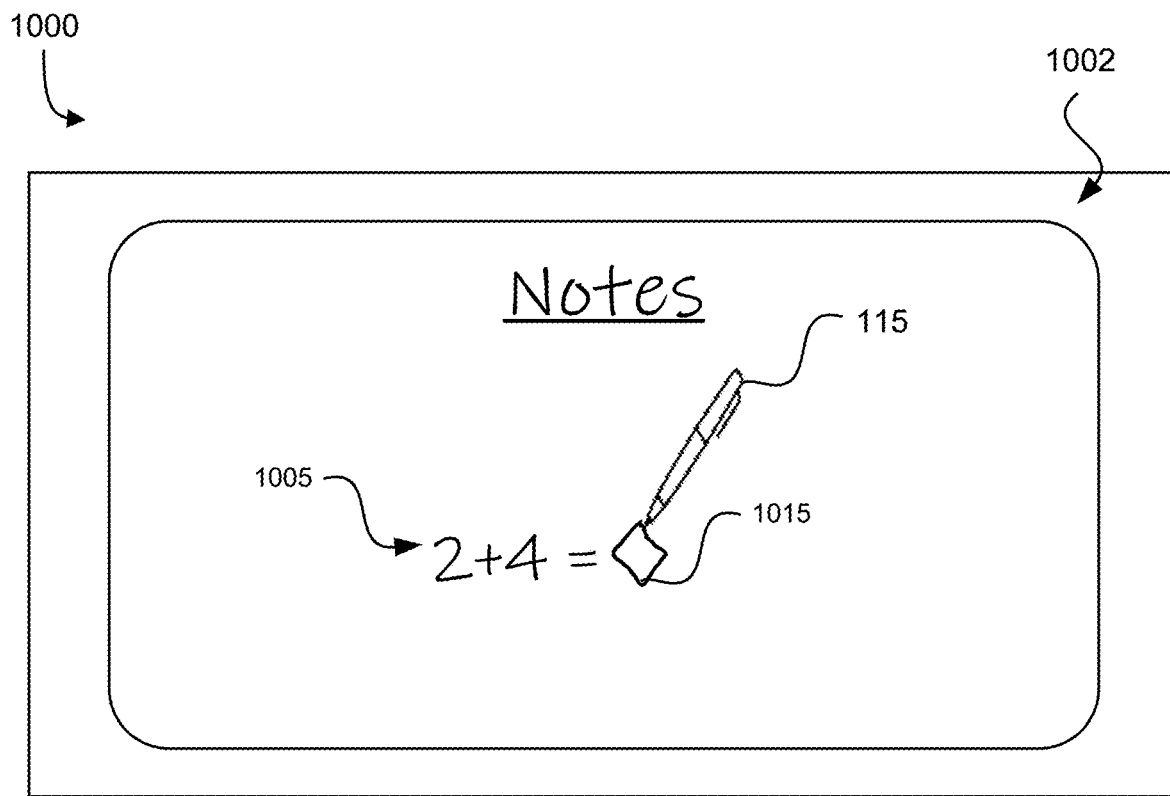
FIG. 6A illustrates a user interface provided by the digital inking application including digital ink invoking a "question" command according to some embodiments.

For example, FIG. 6A illustrates a user interface 1000 provided via the digital inking application 110. The user interface 1000 includes a portion of an electronic document (e.g., a digital journal) within a canvas 1002. As illustrated in FIG. 6A, within the canvas 1002, a user may ask a question in digital ink (e.g., a digitally inked question 1005) and receive an answer in digital ink within the canvas 1002. For example, to receive an answer to the digitally inked question 1005, the user can mark the digitally inked question 1005 via digital ink including a predetermined signifier 1015 associated with a "question" command. In some embodiments, the predetermined signifier 1015 for invoking a "question" command can include a predetermined shape, such as, for example, a circle, a triangle, a rectangle, a diamond, or another predetermined shape drawn adjacent to the digitally inked question 1005 (e.g., within a predetermined distance from the digitally inked question 1005 or adjoining or overlapping the digitally inked question 1005). In other embodiments, the predetermined signifier 1015 for invoking a "question' command can include a predetermined character or predetermined string of characters, such as for, example, a stylized question mark, the word "ask," the word "question," the abbreviation "ques," or the like. Also, in some embodiments, the predetermined signifier 1015 includes a combination of at least two of a predetermined shape, a predetermined character, and a predetermined string of characters. The digitally inked question 1005 is dry ink within the canvas 1002.

Figure 6B:
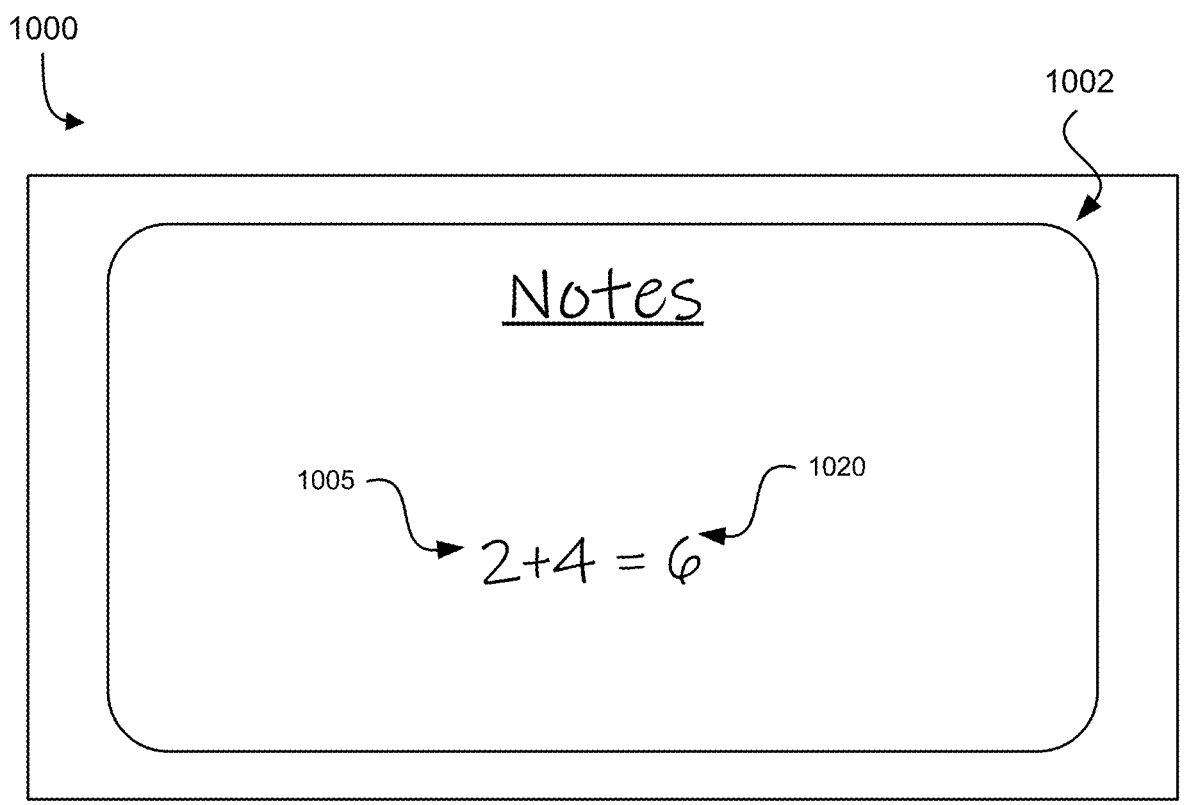
FIG. 6B illustrates a user interface provided by the digital inking application including digital ink representing an answer to a digitally inked question according to some embodiments.

As illustrated in FIG. 6B, in response to invoking the "question" command, an answer 1020 (e.g., in digital ink form) can be added to the canvas 1002, such as in place of the predetermined signifier 1015.

Figure 7:
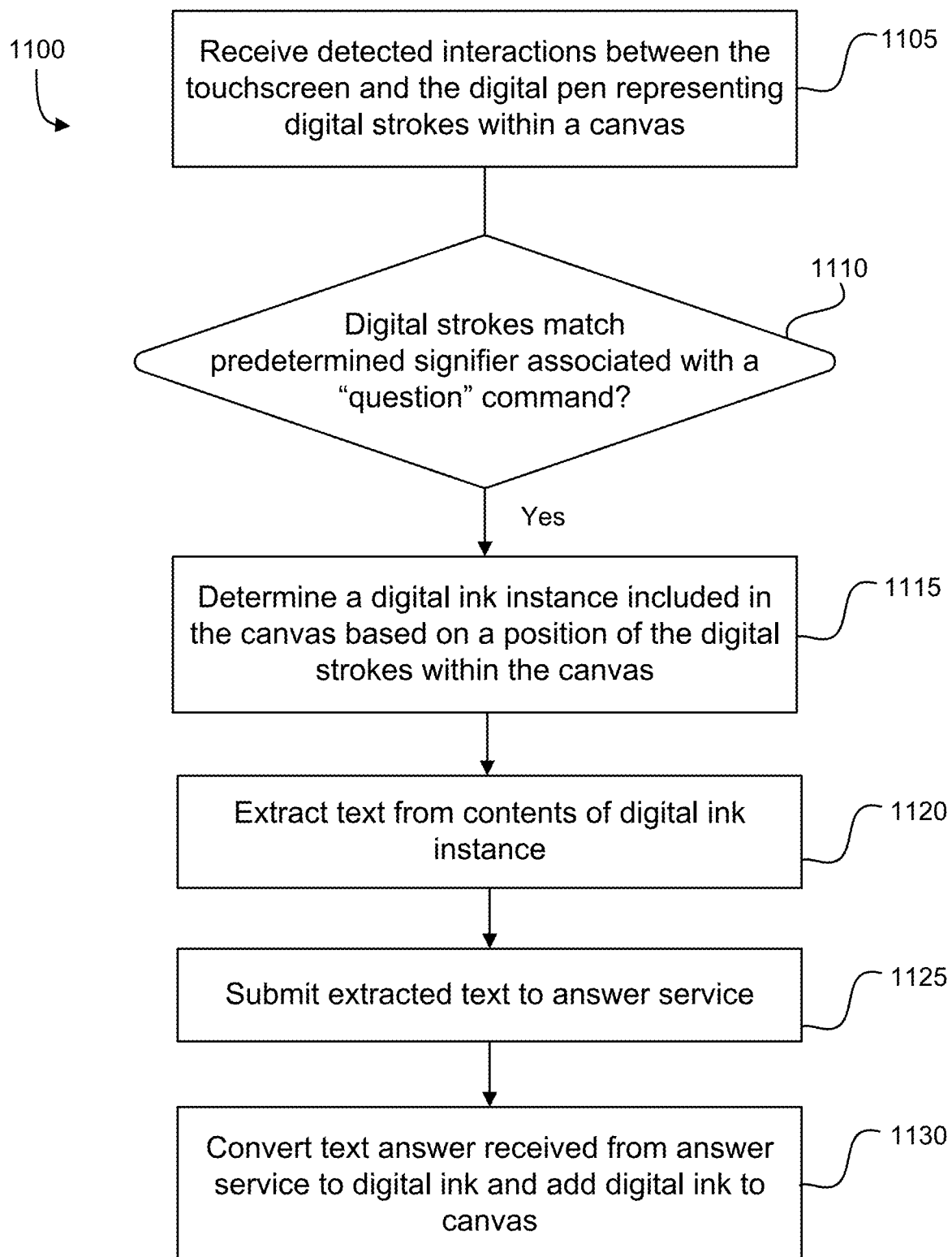
FIG. 7 is a flow chart illustrating a method of submitting a question via digital ink within a canvas according to some embodiments.

FIG. 7 is a flow chart illustrating a method 1100 of submitting a question via digital ink according to some embodiments. The method 1100 is described as being performed by the digital inking application 110 (and the components described above with respect to FIG. 3) as executed by the electronic processor 204 of the user device 105. However, as noted above, in some embodiments, the method 1100 or portions thereof may be performed by the digital inking service 130 provided via the server 140.

As illustrated in FIG. 7, the method 1100 includes receiving detected interactions between the touchscreen 220 and the digital pen 115 representing one or more digital strokes within a canvas displayed via the touchscreen 220 (at block 1105). The digital inking application 110 analyzes the digital strokes to detect whether the digital strokes match a predetermined signifier associated with a "question" command (at block 1110). As described above, in some embodiments, the predetermined signifier for invoking a "question" command includes a predetermined mark, such as a diamond, circle, a rectangle, a triangle, or another predetermined shape.

In response to detecting that the digital strokes match the predetermined signifier, the digital inking application 110 invokes the "question" command and determines a digital ink instance within the canvas based on a position of the digital strokes (at block 1115). For example, to determine the digital ink instance, the digital inking application 110 can use the state of the electronic document included in the canvas (as defined by the DOM) to determine existing digital ink (i.e., dry ink) positioned adjacent to the predetermined mark. In particular, when the predetermined mark is a shape drawn next to existing digital ink, digital ink positioned adjacent to the predetermined mark includes a digital ink instance including one or more digital strokes or ink points positioned within a predetermined distance of digital strokes or ink points of the predetermined mark. In some embodiments, the digital inking application 110 may be configured to identify digital ink adjacent to the predetermined mark in a particular direction (e.g., following or to the right of the digital ink). However, in other embodiments, the predetermined mark can be placed adjacent to the question in any direction within the canvas 1002.

After determining the digital ink instance adjacent to the predetermined mark, the digital inking application 110 extracts text from the digital ink instance (i.e., converts the contents of the digital ink instance to text using handwriting recognition technology) (at block 1120) and submits the extracted text to an answer service as a query, which be accessible over one or more networks (at block 1125). As noted above, in some embodiments, the answer service includes the Bing® Instant Answer service provided by Microsoft Corporation. However, other similar answer or search engine services may be used. Also, in some embodiments, the answer service may be included as part of the digital inking application 110 or stored locally on the user device 105.

In response to receiving a text-based result to the submitted text query from the answer service, the digital inking application 110 converts the text-based result to digital ink (e.g., as described below) and adds the generated digital ink to the canvas as a new digital ink instance (at block 1130). In some embodiments, the digital inking application 110 positions the new digital ink adjacent to the digital ink forming the question or otherwise aligns the new digital ink with the original digital ink forming the question in at least one direction (e.g., vertically, horizontally, or a combination thereof). In some embodiments, the digital inking application 110 positions the new digital ink in place of the predetermined mark that triggered the "question" command (e.g., as this digital ink is wet ink representing a pen command as described above that is removed from the canvas). It still other embodiments, the answer (in digital ink form) can be combined with the question to form a new or updated digital ink instance within the canvas.

In some embodiments, the digital inking application 110 is also configured to initially convert the text to a particular font, a particular font size, or a combination thereof. For example, the digital inking application 110 can be configured to initially convert the text to a size matching a size (e.g., height of characters within the digitally inked question). Similarly, the digital inking application 110 can be configured to initially convert the text to a particular font, such as script-like font or a font that matches characteristics of the digitally inked question). The digital inking application 110 may also apply formatting to the text (e.g., bolding, underlining, italics, etc.) to match the digitally inked question. Performing one or more of these initial conversions causes the resulting generated text to better match the digitally inked question. In some embodiments, depending on how the digital ink is generated from the text-based answer, the digital inking application 110 can perform this conversion or formatting on the generated ink rather than as pre-processing on the text-based answer.

The new digital ink is added to the DOM of the electronic document and is represented like any other digital ink within the canvas (e.g., a collection of ink points or strokes at particular locations). Thus, the new digital ink (representing the answer to the digitally inked question) can be manipulated in the same manner as digital ink originally inked using the digital pen 115. This manipulation includes, for example, erasing part of a character of the digital ink, manipulating the location of individual characters, manipulating an orientation of the digital ink, etc. Also, in some embodiments, a user can draw the predetermined mark associated with the "question" command adjacent to the new digital ink representing the answer to submit the answer (or a version thereof) as yet another question. In other words, functions and pen commands associated with digital ink is also available for use with the new digital ink generated from the received answer.

Accordingly, rather than providing a dedicated portion of a user interface, such as a search box, where a user can input text (or even digital ink) to ask a question, the digital inking application 110 can be configured to allow a user to ask a question with digital ink directly in the canvas by drawing a specific symbol to mark the digital ink as a question to be submitted to an answer service. Furthermore, rather than receiving the result in text, the digital inking application 110 can provide the result as ink, the user can position and otherwise modify the answer as needed within the electronic document. This functionality gives the user flexibility when organizing content within the electronic document and preserves a visual style of the electronic document. For example, by preserving the original query or question in digital ink and providing the resulting answer in digital ink, an overall structure or visual style of the electronic document is maintained consistent.

It should be understood that the question illustrated in FIGS. 6A and 6B is provided as one example question and the digital inking application 110 may be configured to provide answers for other types of questions and, in particular, is not limited to answer numerical or math questions. For example, the digital inking application 110 (through the answer service) may be configured to answer general questions with discrete answers, such as, for example, "How tall is the Space Needle?" and "What time is it in Paris?" Also, in some embodiments, the answer may be associated with a link (e.g., a hyperlink), wherein, in response to receiving a selection the answer, a source of the answer can be provided to the user (e.g., within the digital inking application 110 or a separate application). In some embodiments, when a digitally inked question results in an answer from the answer service that is not a finite answer, the digital inking application 110 may output an error message, which may be provided as text or digital ink.

Converting Text to Digital Ink

Typically, when an inking application wants to programmatically provide text to the user, the application uses a script-type font for the text, which is overlaid on the canvas as a separate object. While the font may look similar to handwritten digital ink, the user is unable to interact with the text using the same controls available for digital ink because the text is not actually digital ink.

Accordingly, to solve these and other issues, the digital inking application 110 can be configured to generate ink from a text font, wherein the generated ink can be added to the canvas as if the user had drawn the ink using the digital pen 115. Generating ink from the text allows the ink to be manipulated like other ink (e.g., erasing part of a character, changing the color, moving the ink to an arbitrary position within the canvas, or the like). As described herein, the digital inking application 110 can convert text to digital ink in response to activation of a "convert" command, which a user may select or invoke in various ways, including, for example, using digital ink provided within the canvas as a pen command. However, the "convert" command can also be automatically invoked by the digital inking application 110, such as, for example, as part of executing other commands like the "question" command described above or as part of providing programmatically-generated feedback to a user, such as by converting programmatically-generated text associated with an error message, a notification, or the like to digital ink for presentation to a user.

Figure 8:
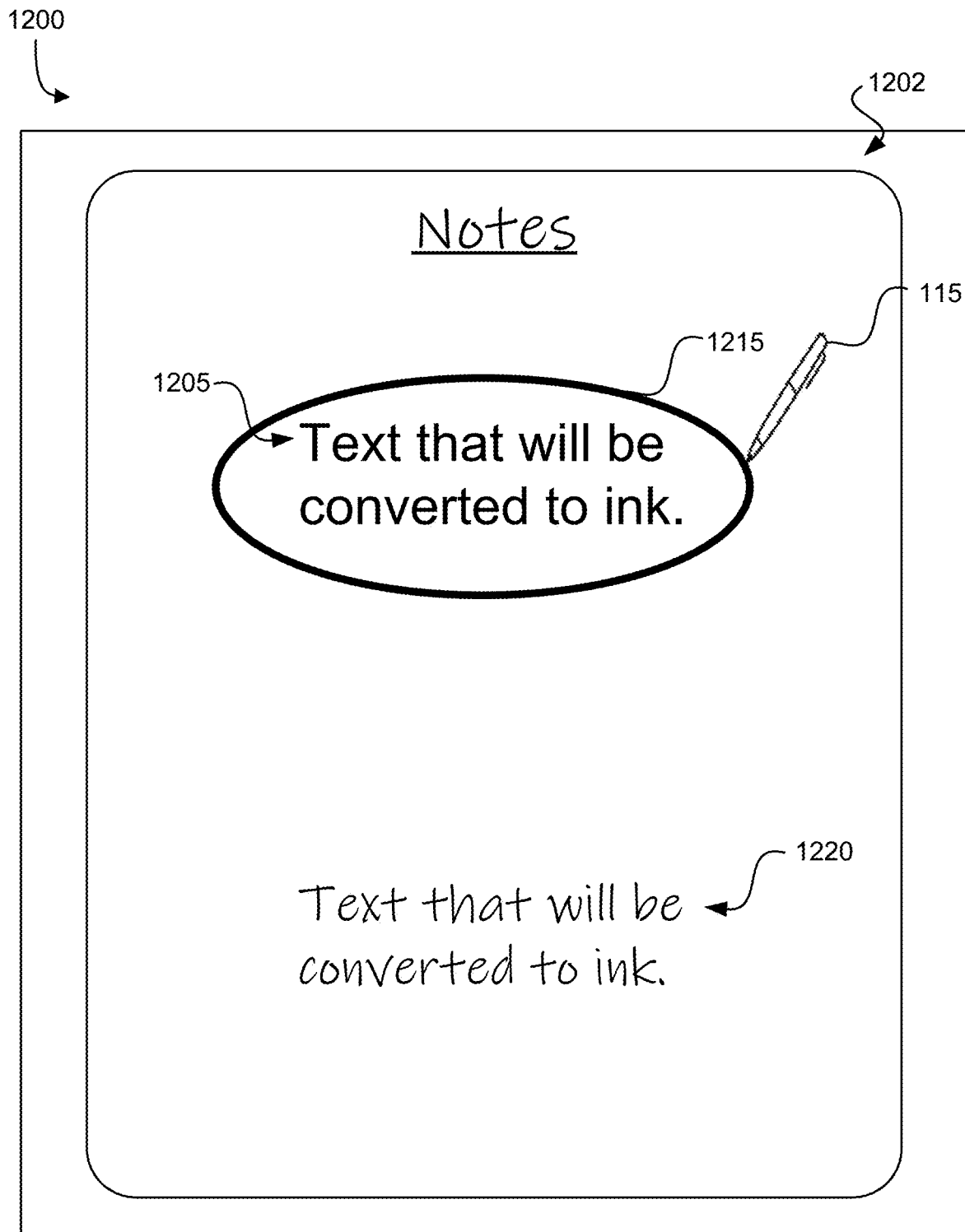
FIG. 8 illustrates a user interface provided by the digital inking application including digital ink generated from text according to some embodiments.

FIG. 8 illustrates a user interface 1200 provided via the digital inking application 110. The user interface 1200 includes a portion of an electronic document (e.g., a digital journal) within a canvas 1202. As illustrated in FIG. 8, the canvas 1002 includes text 1205 which is provided as a separate object overlaid on the top of the canvas 1002. The text 1205 may be copied into the canvas 1202 from another application or data source. Alternatively or in addition, the text 1205 may be typed or otherwise entered into the canvas, such as via a keyboard. To convert the text 1205 to digital ink, a user can use the digital pen 115 to draw a predetermined mark 1215 adjacent to the text 1205 (e.g., within a predetermined distance from the text 1205, around the text 1205, or the like). In some implementations, the predetermined mark 1215 may be a circle, a square, a triangle, or other predetermined shape. The digital inking application 110 identifies the predetermined mark 1215 as invoking a "convert" command and generates digital ink 1220 based on the text 1205 associated with the predetermined mark 1215. As illustrated in FIG. 8, in some embodiments, the generated digital ink 1220 is added to the canvas 1202 including the original text 1205. The original text 1205 may be retained within the canvas 1202 or, in some embodiments, may be removed.

Figure 9:
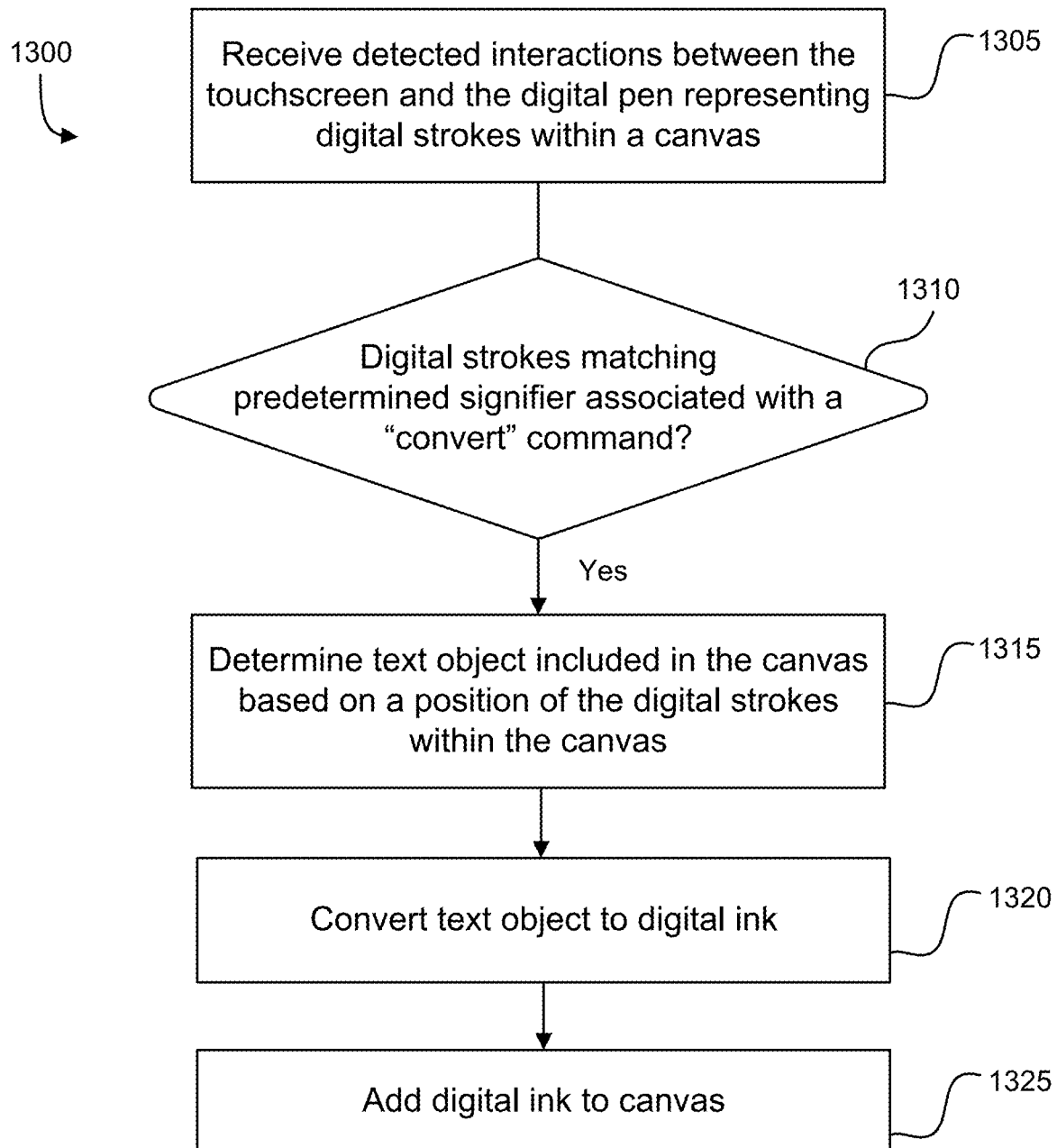
FIG. 9 is a flow chart illustrating a method of converting text to digital ink within a canvas according to some embodiments.

FIG. 9 is a flowchart illustrating a method 1300 of converting text to digital ink within a canvas according to some embodiments. The method 1300 is described as being performed by the digital inking application 110 (and the components described above with respect to FIG. 3) as executed by the electronic processor 204 of the user device 105. However, as noted above, in some embodiments, the method 1300 or portions thereof may be performed by the digital inking service 130 provided via the server 140.

The method 1300 includes receiving detected interactions between the touchscreen 220 and the digital pen 115 representing one or more digital strokes within a canvas included in an electronic document displayed via the touchscreen 220 (at block 1305). The digital inking application 110 analyzes the digital strokes to detect whether the digital strokes matches a predetermined signifier for invoking a "convert" command (at block 1310). As described above, in some embodiments, the predetermined signifier for invoking a "convert" command includes a predetermined mark, such as a diamond, circle, a rectangle, a triangle, or another predetermined shape, which may be added adjacent to (e.g., around) text within the canvas.

In response to detecting that the digital strokes match the predetermined signifier, the digital inking application 110 invokes the "convert" command and determines a text object within the electronic document based on a position of the digital strokes (at block 1315). The digital inking application may identify this text object by identifying a text object within a predetermined distance from the predetermined mark or at least partially within or overlapping with the predetermined mark.

After identifying the text object to convert (at block 1315), the digital inking application 110 converts the text to digital ink (at block 1320). The digital inking application 110 can generate the digital ink by generating or rendering an image of the text and then tracing characters within the image to produce ink points that are orientated in the same manner as the characters of the text. The characters within the image can be traced by tracing an outline of each character included in the text, a line established down the center of each stroke of a character, filling in an area represented by the characters (e.g., creating ink points that fill or otherwise overlap with the strokes establish each character within the image), or the like. The ink points can be joined to form digital strokes representing the characters of the text and the ink points and digital strokes can be stored in the DOM as another digital ink instance.

For example, in some embodiments, to render an image of text, the digital inking application 110 can call a text renderer service or function (e.g., via an application programming interface). The text renderer is configured to convert characters in a particular font into a set of calls to draw lines from one point to another. This type of text renderer decouples the understanding of what a "font" is from knowledge about how to draw the lines representing text in the font, as the lines may need to be rendered on a screen, saved to a bitmap in memory, or printed onto physical paper. For example, input to the text renderer can include the one or more characters to be rendered (e.g., a string of one or more characters), an identifier of a font, and an identifier of a font size. The text renderer returns a set of lines, which can be represented as a series of Bezier control points. The digital inking application 110 converts the output from the text renderer to a series of coordinates (e.g., x and y coordinates), which the digital ink application 110 saves to memory (rather than rendering the lines on a screen). When the text renderer is complete, the digital ink application 110 converts the coordinates into ink points and ink strokes (e.g., using one or more application programming interfaces).

The "rendered" ink points and associated ink strokes may be defined relative to a default coordinate (e.g., (0,0)) and, thus, the ink points and ink strokes may not have positional information. Accordingly, the digital inking application 110, after generating the ink strokes, can be configured to apply an additional transform to move the ink points and ink strokes to the location within the canvas where the digital ink should be provided. This transformation can include adding fixed values for X and Y to each ink point to move the ink point to the desired position, which, as noted above, may be determined based on original position of the text, other digital ink within the canvas (e.g., a digitally-inked question), or the like.

After the strokes are the desired position, the strokes are added to the DOM just like any other digital ink directly input via a user with the digital pen 115. Accordingly, from the viewpoint of the digital inking application 110, there's no difference between ink that gets generated from text as compared to ink that was directly input via the digital pen 115. In particular, after the ink points and ink strokes are added to the DOM, the user can do anything with the digital ink (and the strokes included therein) that the user could do with directly-input digital ink.

Accordingly, in some embodiments, rather than rendering a string of text into a bitmap and then converting the bitmap to digital ink, the digital inking application 110 is configured to hook into the rendering process for text before the text gets rendered to a bitmap and then "render" the text as digital ink.

After generating the digital ink, the digital inking application 110 adds the digital ink to the canvas (e.g., adds the digital ink instance to the DOM, including position information based on where the new ink is added within a page of the electronic document) (at block 1325). In some embodiments, the digital inking application 110 replaces the text with the generated digital ink (i.e., removes the text from the canvas and adds the generated digital ink within a page in place of the removed text at the same position as the original text). However, in other embodiments, the digital inking application 110 retains the text within the canvas, which may allow the user to decide whether to remove or retain the text or check an accuracy of the generated digital ink. When the digital inking application 110 replaces the text with the generated digital ink, the digital inking application 110 may position the generated digital ink to match the original position of text within the canvas. In addition, as noted above, the digital inking application 110 may be configured to perform various pre-processing of the text, such as by converting the text to a particular font or font size (e.g., based on characteristics of existing digital ink within the electronic document).

As noted above, generating ink from a text font allows users to interact with the "text" using the same toolset as when they are inking with the digital pen 115. Existing solutions either require a different toolset to be used or disallow any interaction altogether. By using a font as the source of the ink, the user has the capability to personalize the way the digital inking application 110 generates ink, such as by installing new fonts onto the user device 105 without the digital inking application needing any corresponding updates. The text conversion described above can be used in various contexts and even by other commands invoked within the digital inking application 110, such as with the question and answer functionality described above with respect to FIGS. 6A, 6B, and 7. In particular, the "convert" command can be invoked by the digital inking application 110 as a way to display various text generated by the computer. For example, the digital inking application 110 can automatically invoke the "convert" command as part of signaling an error to the user or providing another type of notification to a user, when synchronizing a list of items (e.g., to-do items) in an electronic journal, wherein the items were authored in a different program (using, for example, a keyboard), and stored as text, as part of managing electronic messages where one user is writing in digital ink but another user involved in the conversation is writing in text (e.g., using a keyboard), and the like. In particular, the "convert" command described above can be used any time the digital inking application needs to provide feedback to the user. Accordingly, the "convert" command can be used to convert existing text included in an electronic document to digital ink or convert text to digital ink before the text is included in the electronic document. Thus, the detection of a pen command as described above with respect to FIGS. 8 and 9 (or other forms of user input or selections) is not required to invoke the "convert" command.

Duplicating Digital Ink Instances

Users often create to-do lists, side notes, question, etc. while taking notes, planning, and thinking through problems within an electronic document. When creating this content within an electronic document using digital ink, these ink objects often end up dispersed throughout pages of the electronic document and, thus, can be difficult for the user to locate and track.

Accordingly, to solve these and other issues, in response to detecting digital ink as being a pen command associated with an "aggregate" command, the digital inking application 110 can be configured to update metadata of a digital ink instance associated with the pen command as a particular type of ink object, duplicate the digital ink instance, and add the duplicated digital ink instance to a summary or aggregate page (or separate document) associated with other ink objects of the same type.

Figure 10A:
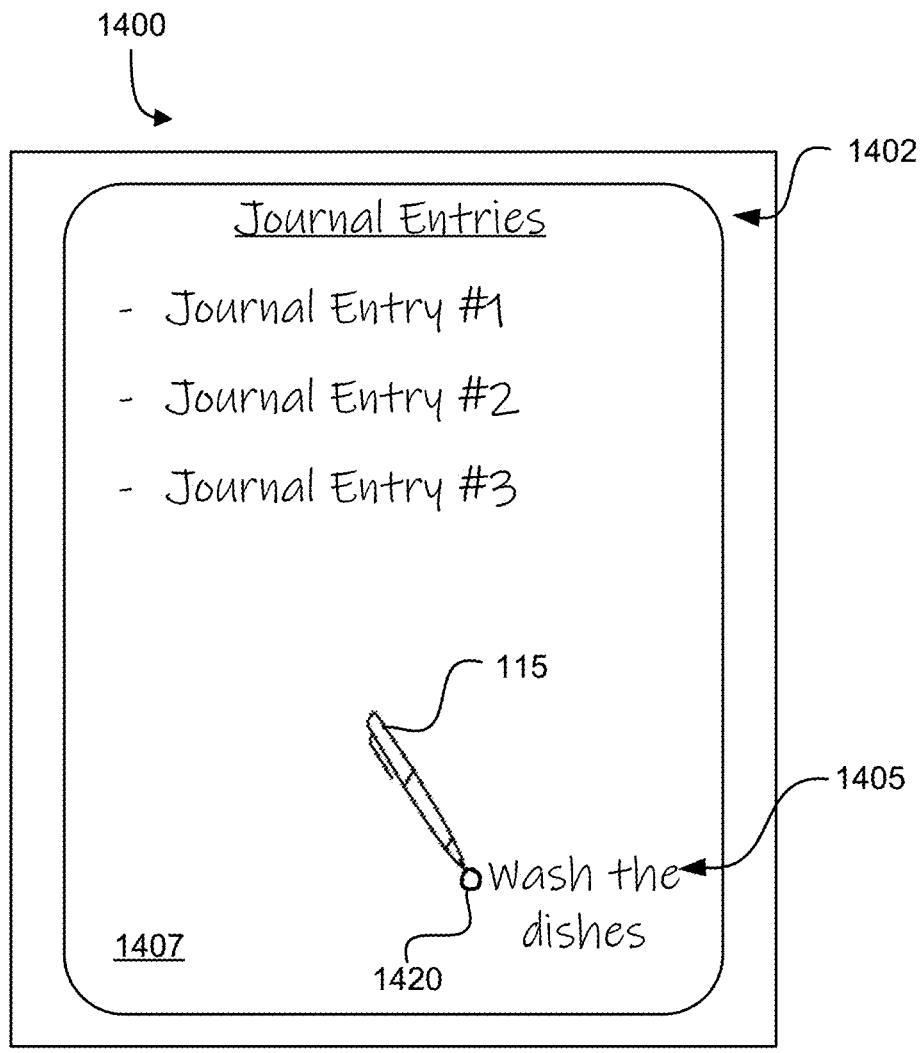
FIG. 10A illustrates a user interface provided by the digital inking application including digital ink invoking an "aggregate" command according to some embodiments.
Figure 10B:
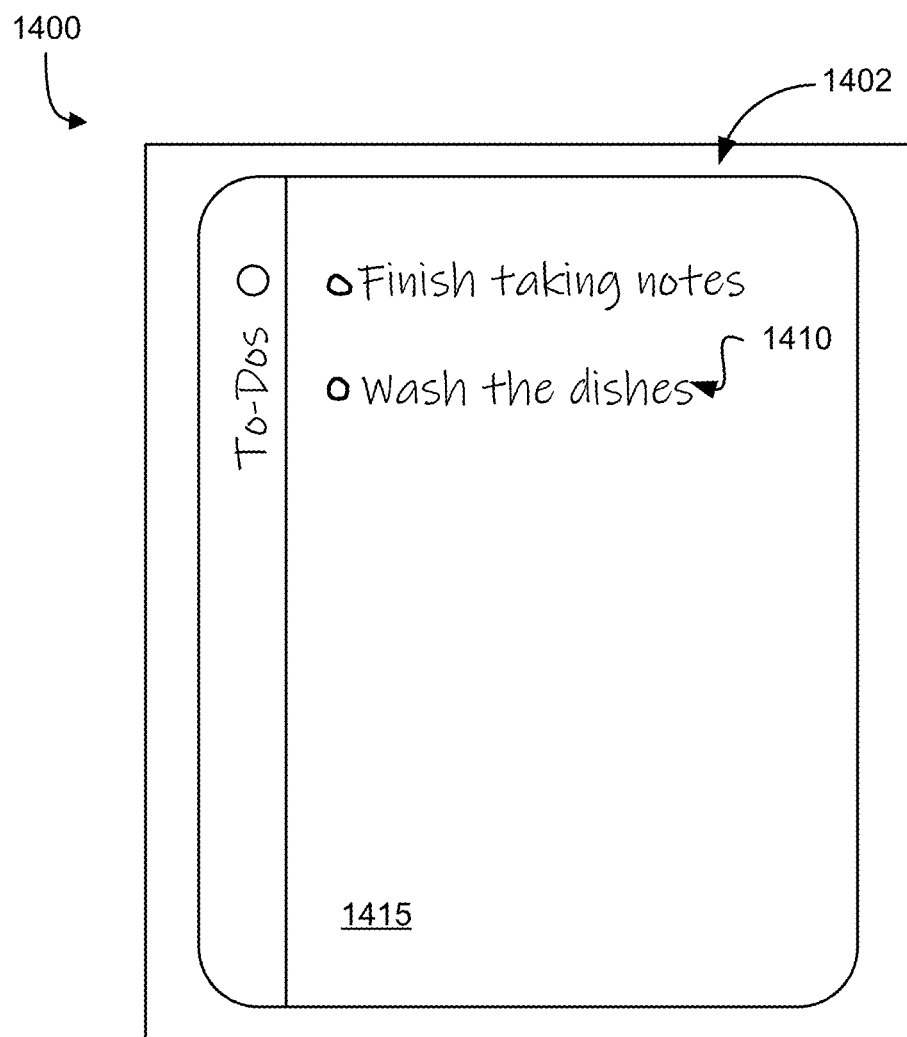
FIG. 10B illustrates a user interface provided by the digital inking application including an aggregation page according to some embodiments.

For example, FIGS. 10A through 10D illustrate user interfaces 1400 provided via the digital inking application 110. The user interfaces 1400 includes a portion of an electronic document (e.g., a digital journal) within a canvas 1402. As illustrated in FIG. 10A, the canvas 1402 includes a digital ink instance 1405 within a page 1407 of an electronic document. The digital ink 1405 is marked by a user as a to-do type object (e.g., using a predetermined signifier 1420 associated with a "aggregate" or "to-do" command, such as a circle positioned adjacent to, for example to the left or before, the digital ink instance 1405), and, in response to this marking, the digital inking application 110 creates a duplicated digital ink instance 1410 and adds the duplicated digital ink instance 1410 to an aggregate page 1415 (which may be in the same electronic document or a separate electronic document) (see FIG. 10B).

Figure 10C:
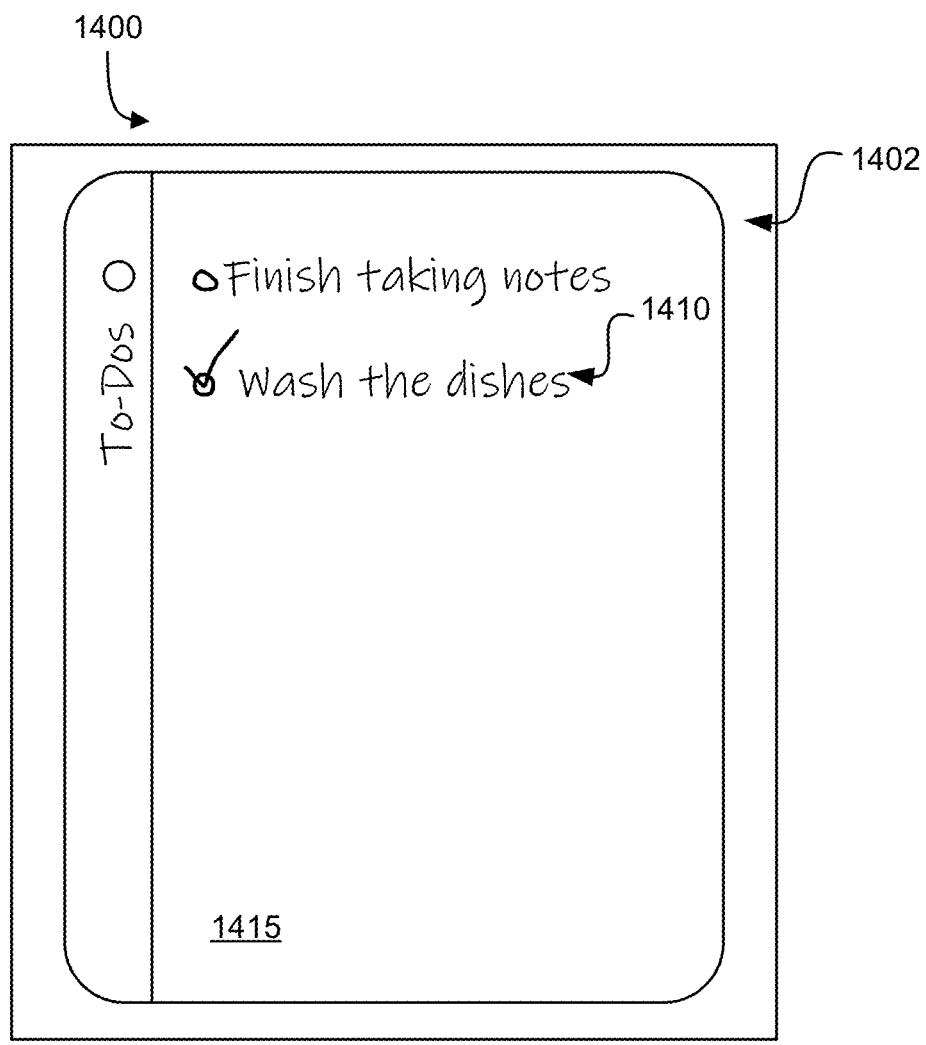
FIG. 10C illustrates a user interface provided by the digital inking application including the aggregation page illustrated in FIG. 10B with an update to a target digital ink instance according to some embodiments.
Figure 10D:
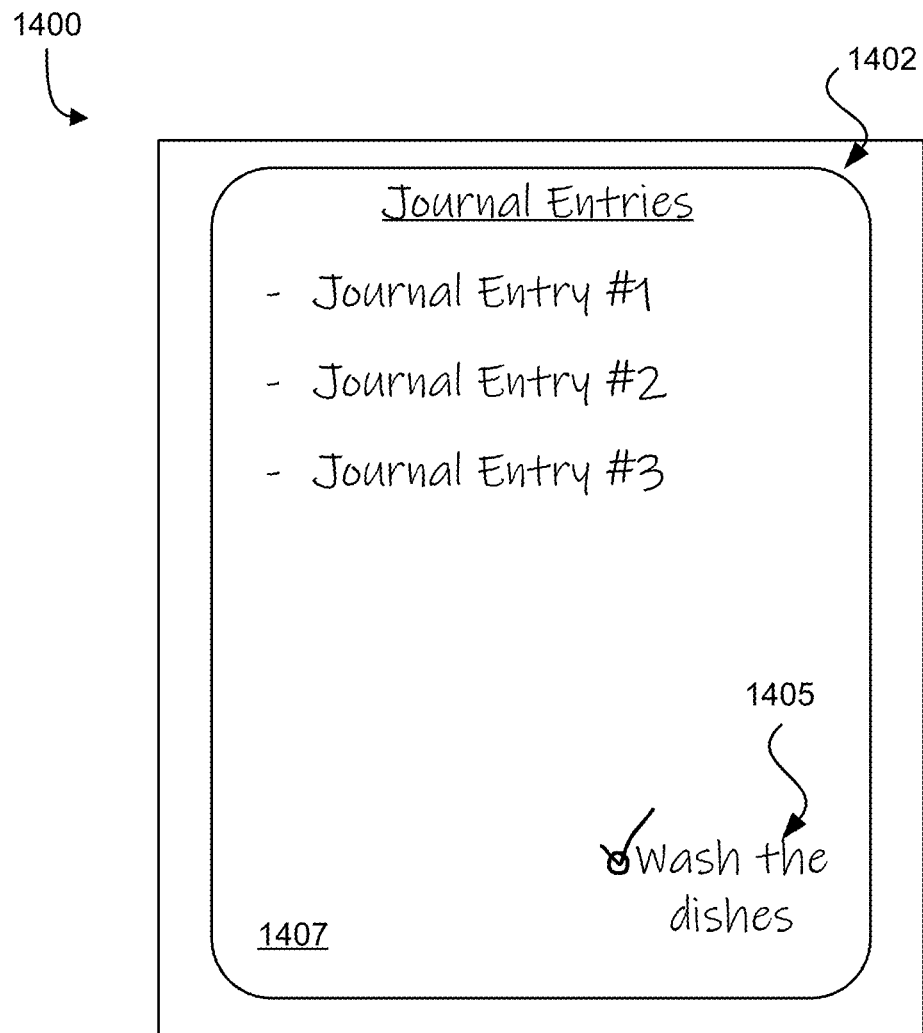
FIG. 10D illustrates a user interface provided by the digital inking application including a source digital ink object updated based on the update to the target digital ink instance illustrated in FIG. 10C according to some embodiments.

As illustrated in FIGS. 10C and 10D, a link is maintained between the original digital ink instance 1405 and the duplicated digital ink instance 1410, such that changes made to the digital ink instance 1405 (such as marking the instance 1405 as complete, such as via the digital pen 115) are automatically applied to the duplicated digital ink instance 1410. The link may be established by having both the digital ink instance 1405 (the source object) and the duplicated digital ink instance 1410 (as stored within the DOM) refer to the same set of ink points or digital strokes.

Figure 11:
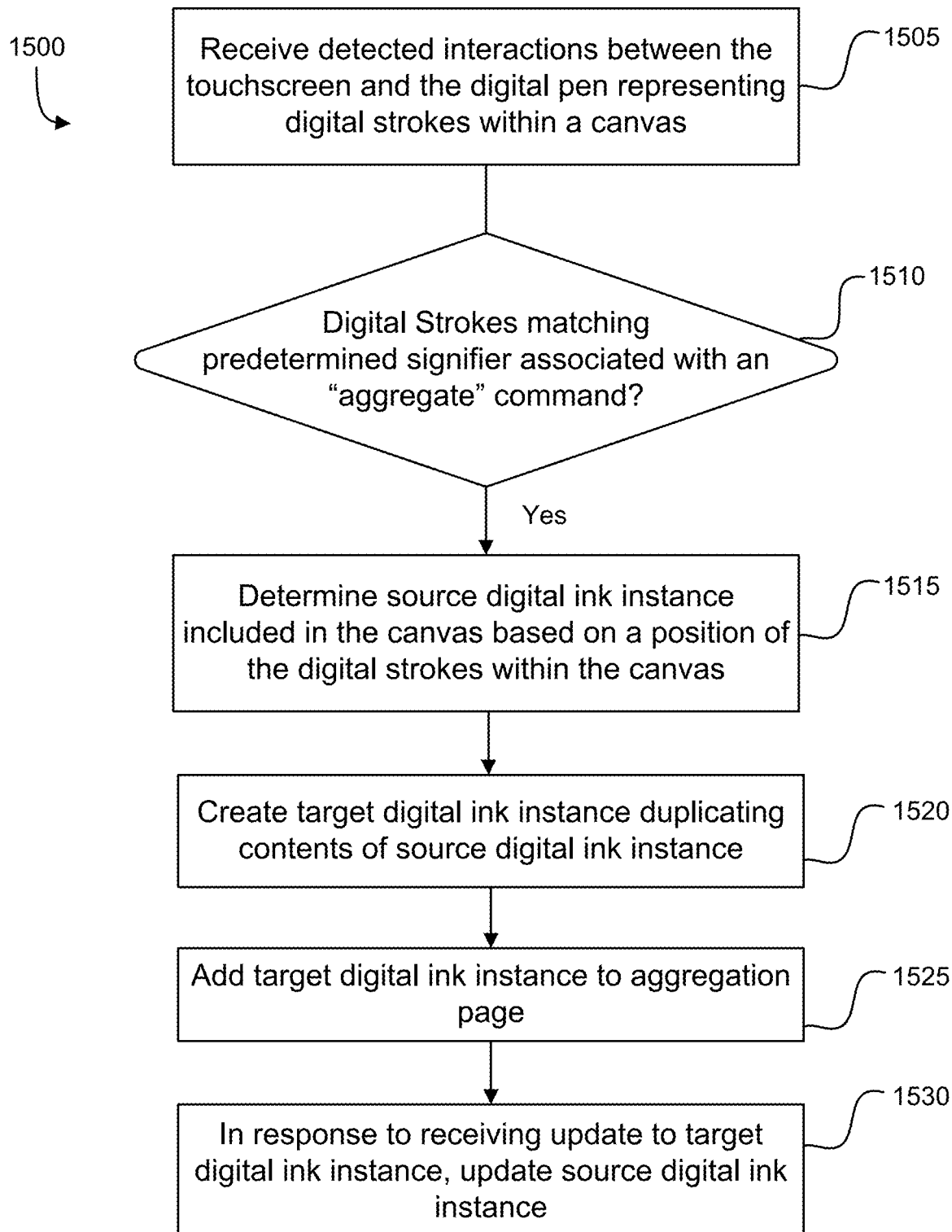
FIG. 11 is a flow chart illustrating a method of aggregating digital ink instances according to some embodiments.

FIG. 11 is a flowchart illustrating a method 1500 of aggregating digital ink instances of a particular type on a particular page (or other portion) of an electronic document according to some embodiments. The method 1500 is described as being performed by the digital inking application 110 (and the components described above with respect to FIG. 3) as executed by the electronic processor 204 of the user device 105. However, as noted above, in some embodiments, the method 1500 or portions thereof may be performed by the digital inking service 130 provided via the server 140.

As illustrated in FIG. 11, the method 1500 includes receiving detected interactions between the touchscreen 220 and the digital pen 115 representing one or more digital strokes within a canvas included in an electronic document displayed via the touchscreen 220 (at block 1505). The digital inking application 110 analyzes the digital strokes to detect whether the digital strokes match a predetermined signifier for invoking an "aggregate" command (at block 1510). As described above, in some embodiments, the predetermined signifier for invoking a "aggregate" command includes a predetermined mark, such as a diamond, circle, a rectangle, a triangle, or another predetermined shape, which may be added adjacent to (e.g., to the left of) digital ink within a canvas.

In response to detecting that the digital strokes match the predetermined signifier, the digital inking application 110 invokes the "aggregate" command and determines a digital ink instance within the canvas based on a position of the digital strokes (at block 1515). The digital inking application 110 may identify an ink instance as being adjacent to the predetermined mark associated with the "aggregate" command when the ink instance is within a predetermined distance from the predetermined mark and, in some embodiments, in a particular direction, such as to the left.

After identifying the digital ink instance (representing an original or source digital ink instance), the digital inking application 110 may update metadata of the source digital ink instance to indicate a particular type associated with the predetermined mark (e.g., a to-do, a list item, a reminder, or the like). The particular signifier included in the detected digital strokes establish the type. For example, a circle symbol may designate "to-do" type objects while a square or rectangle symbol may designate "list" type objects.

The digital inking application 110 also creates a duplicated digital ink instance (representing a target digital ink instance) that includes the same content as the source digital ink instance (at block 1520) and adds the duplicated digital ink instance to an aggregation page or portion of the electronic document (or a separate electronic document) associated with the type of the source digital ink instance that aggregates digital ink instances of the specified type (at block 1525).

As part of creating the duplicated digital ink instance, the digital inking application 110 establishes a link between the source digital ink instance and the target digital ink instance. As noted above, this link may be established by having both the source digital ink instance and the duplicated target digital ink instance reference the same set of ink points, the same set of digital strokes, or both within the DOM. Thus, in response to receiving an update to the target digital ink instance (at block 1530), the digital inking application 110 can automatically apply the same update to the source digital ink instance (and vice versa).

As described above, by aggregating ink objects (e.g., of a particular type or otherwise marked by a user or automatically recognized) on a dedicated page or portion of an electronic document, a user can more easily navigate and track related ink objects, such as to-dos, lists, or reminders. Since the objects on these aggregation pages maintain their relationship with the source objects, when a user makes changes on an aggregation page, the same changes are reflected on the source page (and vice versa). For example, when a user creates a to-do on a page in a digital journal, the to-do also appears on an aggregation page for "to-do" objects, which accumulates ink objects marked or identified as to-dos (e.g., via a predetermined signifier as described above). Similarly, when the user updates the to-do on the aggregation page (e.g., marks the to-do as being complete), the original or source to-do is also marked as being complete (e.g., to avoid any confusion due to conflicting information within the journal).

Accordingly, the digital inking application 110 can be configured to organize objects and create aggregated lists or pages without requiring that the objects (such as digital ink) be initially converted to text. As noted above, converting digital ink to text removes the personalization of how the user originally created the content and prevents the user rom being able to edit the content with the same tools (inking tool) originally used to create the content. Also, creating a mere copy of content without establishing a link between the copies can cause the user to lose track of content as edits made to the original content is not reflected in the copy and vice versa.

Also, in some embodiments, by maintaining a semantic understanding of the meaning of the ink, not just a collection of ink strokes, the digital inking application 110 can also be configured to not only create exact duplicate copies of digital ink in different locations but also modify how the duplicate copy is presented within the canvas. For example, a digital ink instance may represent a task to be the performed and the user may write the task over multiple lines due to constraints on the dimensions of the page and available space. By understanding lines of characters within a digital ink instance are a single unit containing multiple words across multiple lines, the digital inking application 110 can not only provide a duplicate ink object at a different location but can also lay out the duplicate ink object in a way that expands or contracts to better fit the space at the new location. This reformatting can be referred to as ink beautification and reflow, which are described below in more detail. Thus, even though a digital ink object is a duplicate of another object and has a link to the original object to maintain a consistent state of the contents of the objects, a duplicate digital ink object can be laid out in the canvas differently without breaking this link.

It should be understood that creating a copy of a digital ink instance and maintaining an association or link between the original digital ink instance and the copy as described above represents one possible implementation for the aggregation feature. For example, in some embodiments, the digital inking application can be configured to create semantic objects (e.g., semantic to-do objects) that reference an ink instance. In this embodiment, as part of creating an aggregation page and rendering the page by semantic objects, the ink instances referenced by the semantic objects are extracted and rendered. In other words, semantic objects work as virtual groups and have references to the ink objects and do not need to have a one-to-one mapping to an ink object. For example, when using semantic objects, one or more words in a line or a plurality of continuous lines can be recognized as entities (phone number, address, people name, etc.) or two ink lines in a paragraph including four ink lines can be recognized as one to-do item.

For example, in this embodiment, in response to a user or automatic (e.g., timed) trigger, a page in an electronic document is analyzed to extract a document structure. In some embodiments, this structure is extracted as a tree with a hierarchy (e.g., page->writing regions (or drawings)->paragraphs->lines->words). In other words, the hierarchy can include a page, which is broken down into one or more writing regions or drawings, and the writing regions are further broken down into one or more paragraphs, wherein each paragraph is broken down into one or more lines where each line has one or more words. Ink objects at the same level within the tree are mutually exclusive in terms of the strokes they own or contain. This hierarchy can be referred to as a layout tree. As part of this same analysis or a separate analysis, semantic objects are recognized, such as recognizing a two lines of ink as a to-do item (e.g., where the first word in the first line includes a predetermined signifier or mark as described above (e.g., a bullet represented as a circle). The recognized semantic objects are defined via a semantic tree that is created and saved with the layout tree in the DOM. For example, using the example two-line to-do item noted above, the semantic tree for an aggregation page for to-do items can include the following: semanticPage (which references the source page)->to-dos->bullet (reference to the ink word referencing the bullet or circle) and lines (reference to the ink lines). Accordingly, when creating and rendering the aggregation page, all semanticPage entries in the semantic tree are iterated and all the to-dos are extracted. The referenced ink lines can be found in the layout tree and used in the rendering. In response to ink objects being modified, semantic trees are also updated as needed. For example, removing a leading word that was previously recognized as a bullet marking a to-do item will cause the to-do item to be removed from the semantic tree. Similarly, in response to the completion of the to-do item, a stroke overlapping with the bullet can be rendered on the aggregation page (e.g., as a checkmark or filling in the bullet).

It should be understood that various different predetermined marks may be established to identify particular types of digital ink instances (e.g., a circle, a square or rectangle, a triangle, or the like) and, in some embodiments, the predetermined marks may be required to be adjacent to associated digital ink in a predetermined direction. Also, in some embodiments, rather than having a user mark or otherwise identify digital objects of a particular type, the digital inking application 110 may be configured to automatically identify (or learn how to identify) such objects based on context, such as the contents of the ink, how the ink is written or structured, headings or subheadings included on the page with the ink, or the like. For example, rather than triggering the aggregation in an active way as described above, aggregation could be performed passively wherein the digital ink application 110 is configured to generate and populate a summary or aggregation page in response to detecting, for example, using heuristics or a machine learning module, one or more predetermined interest items (e.g., a list, a to-do item, or the like).

Pen Tilt to Highlight

As described above, switching between modes with a digital pen 115 creates inefficiencies that are duplicated every time such a switch is needed (which can be often). For example, the digital inking application 110 may provide a highlighting tool that enables a user to highlight content, including digital ink, within the canvas using the digital pen 115. To switch to using the digital pen 115 as a highlighter, the user may be required to access a menu within the application 110 and select a highlighting tool. When the user is done with the highlighting tool, the user similarly has to access a menu to switch back to the pen tool. This context switching wastes time and processing resources and disrupts the user's flow. In fact, even if a user can access a menu or a highlighting tool through selecting a button on the digital pen 115, this still requires the user to stop writing, change the grip on the digital pen to access the button, and often requires additional input to confirm the mode switch.

Accordingly, to solve these and other issues, the digital inking application 110 can be configured to automatically switch to a highlighter mode in response to detecting a particular tilt of the digital pen 115.

Figure 12A:
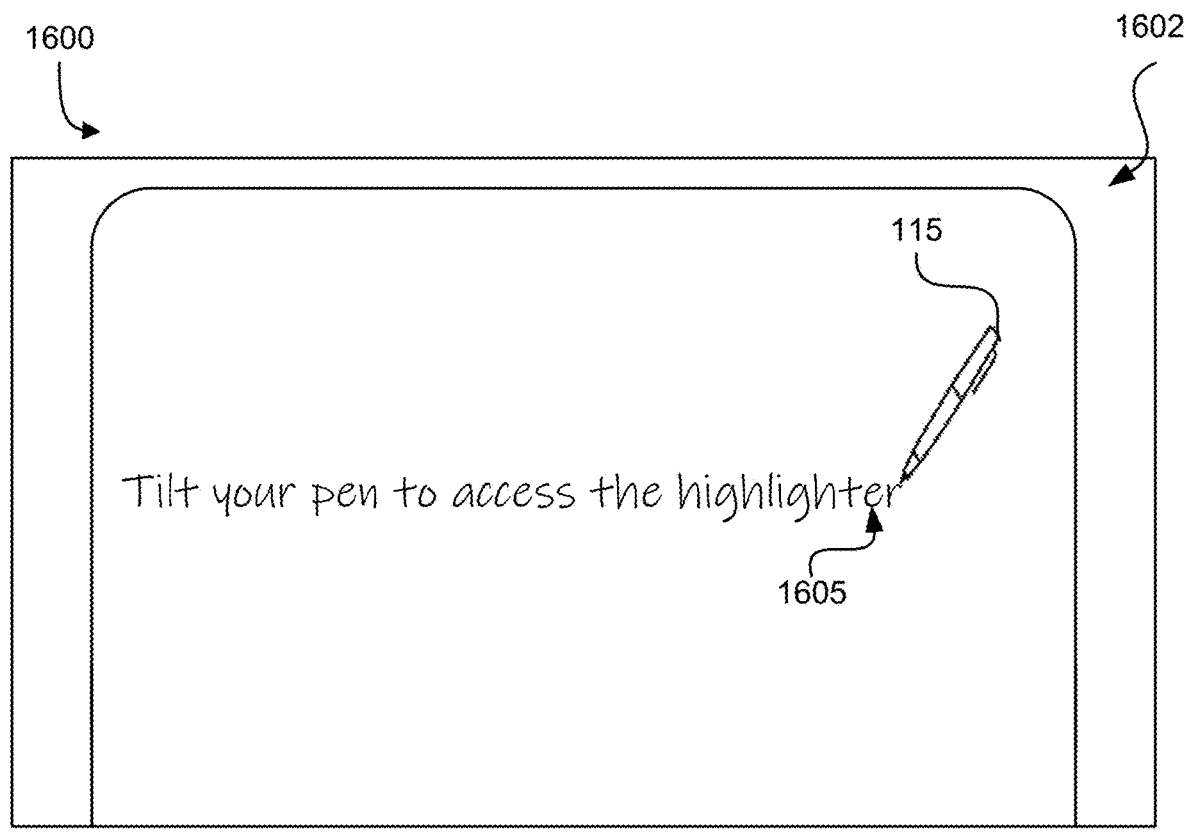
FIG. 12A illustrates a user interface provided by the digital inking application including digital ink within a canvas input via a digital pen operated in a first input mode according to some embodiments.
Figure 12B:
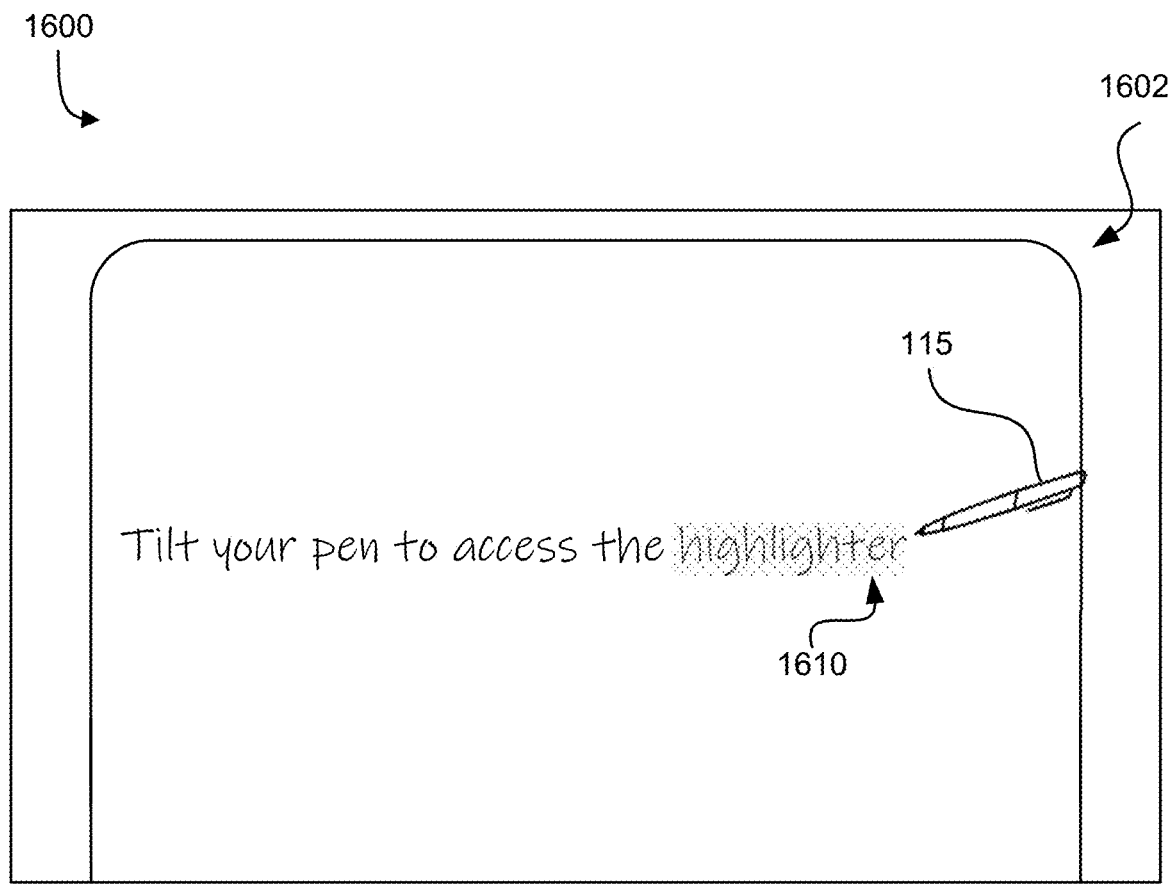
FIG. 12B illustrates a user interface provided by the digital inking application including highlighting added to the digital ink illustrated in FIG. 12A via a digital pen operated in a second input mode according to some embodiments.

For example, FIGS. 12A and 12B illustrate user interfaces 1600 provided via the digital inking application 110. The user interfaces 1600 includes a portion of an electronic document (e.g., a digital journal) within a canvas 1602. As illustrated in FIG. 12A, the canvas 1602 includes a digital ink instance 1605 within an electronic document. In some embodiments, the digital in instance 1605 was created via the digital pen 115. As illustrated in FIG. 12B, to switch the digital pen 115 to a highlighting mode or tool, a user can change the tilt of the digital pen 115. After switching to the highlight mode, the user can use the digital pen 115 to highlight existing digital ink (i.e., dry ink) within the canvas 1602.

Figure 13:
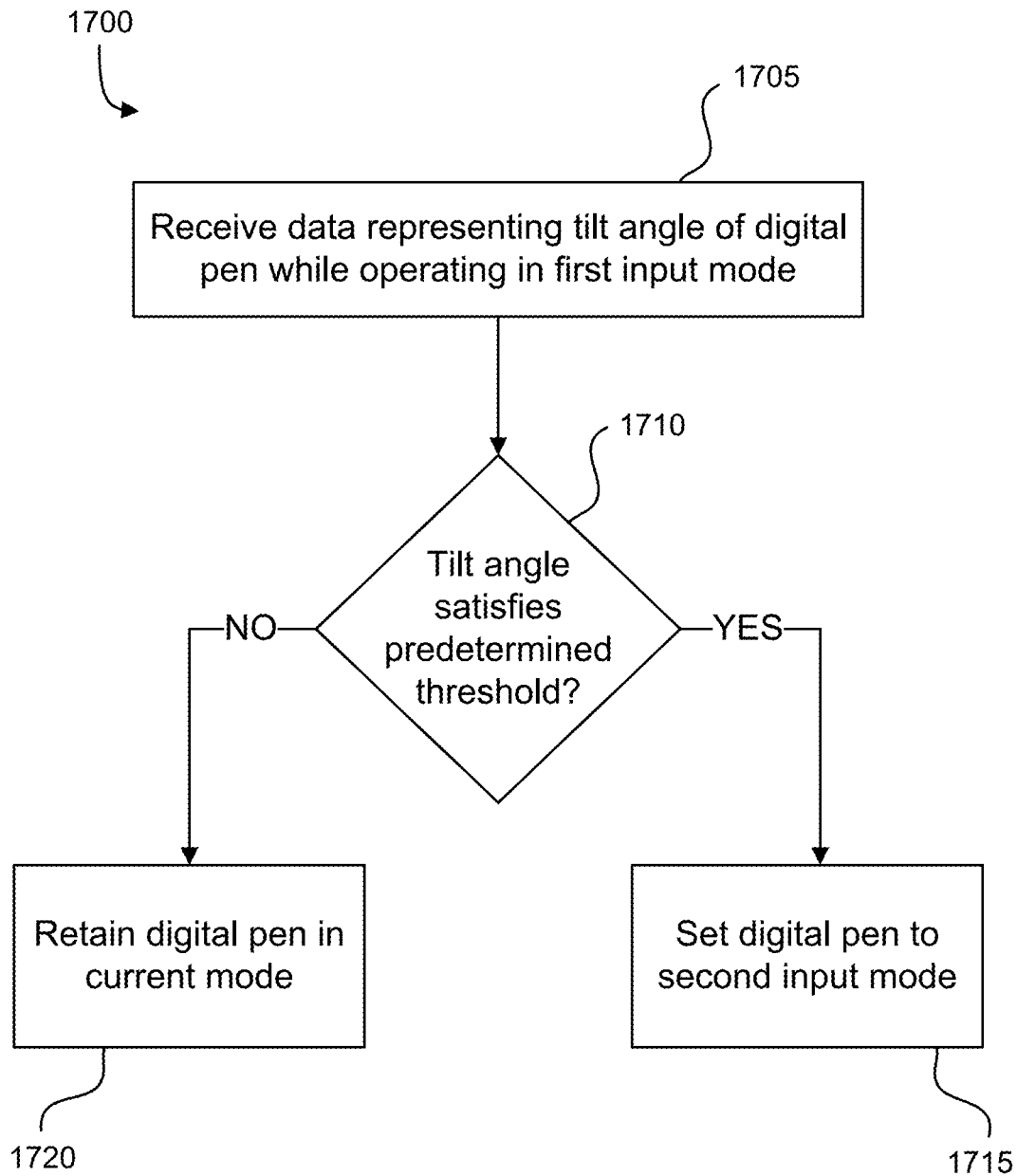
FIG. 13 is a flow chart illustrating a method of switching a digital pen from a first input mode to a second input mode according to some embodiments.

FIG. 13 is a flow chart illustrating a method 1700 of activating a highlighting mode of a digital pen 115 according to some embodiments. The method 1700 is described as being performed by the digital inking application 110 (and the components described above with respect to FIG. 3) as executed by the electronic processor 204 of the user device 105. However, as noted above, in some embodiments, the method 1700 or portions thereof may be performed by the digital inking service 130 provided via the server 140.

As illustrated in FIG. 13, the method 1700 includes receiving, while the digital pen 115 is operating in a first input mode (e.g., an inking mode), data representing a current tilt angle of the digital pen 115 (at block 1705). In some embodiments, the digital inking application 110 is configured to receive positional information, including tilt angle, from the digital pen 115 when the pen 115 includes an active pen. For example, as noted above, the digital pen 115 can include electronic components or circuitry, such as an inertial measurement (IMU), such one or more accelerometers, gyroscopes, magnetometers, and the like, that allow the digital pen 115 to detects an tilt angle (e.g. with respect to a horizontal position, such as a surface of the touchscreen 220) and this information can be transmitted to the user device 105 (e.g., via a digitizer included in the user device 105). Alternatively or in addition, the digital inking application 110 can be configured to detect the tilt angle of the digital pen 115 based on data received from other data sources, such as based on detected interactions between the digital pen 115 and the touchscreen 220, one or more cameras included in the user device 105 configured to detect a position of the digital pen 115, or the like. In some embodiments, the digital inking application 110 is configured to detect the tilt angle of the digital pen 115 when the digital pen 115 is contacting the touchscreen 220. For example, the digital inking application 110 can be configured to determine a title angle of the digital pen 115 for each digital stroke made via the digital pen 115. For example, a tilt angle of the digital pen 115 may be detected using a pointer segment tracker that tracks interactions between the digital pen 115 and the touchscreen, such as the displacement of the tip of the digital pen 115 from the touchscreen 220, which varies as the digital pen 115 is tilted by different amounts. However, in other embodiments, the digital inking application 110 may be configured to detect the tilt angle of the digital pen 115 regardless of whether the digital pen 115 is contacting the touchscreen.

Based on the tilt angle, the digital inking application determines whether the tilt angle satisfies a predetermined threshold associated with a second input mode (e.g., by comparing the detected tilt angle to the predetermined threshold) (at block 1710). In response to the tilt angle satisfying the predetermined threshold associated with the second input mode, the digital inking application 110 sets the input mode of the digital pen 115 to the second input mode, which, as described above, may be a highlighting mode (at block 1715). Alternatively, in response to the tilt angle not satisfying the predetermined threshold associated with the second input mode, retaining the digital pen 115 in its current mode (e.g., the first input mode) (at block 1720).

In some embodiments, when the second input mode is the highlighting mode, the predetermined threshold associated with second input mode is specified in terms of degrees (e.g., from a horizontal position, wherein a tilt angle of approximately 90° represents a vertical position of the digital pen 115) and, in some embodiments, is 60°. In this embodiment, a current tilt angle of the digital pen 115 satisfies the predetermined threshold when the current tilt angle is equal to or less than 60°. For example, when using the digital pen 115 as a pen or other writing device to digitally ink content, a user typically holds the digital pen 115 in a generally upright position (e.g., greater than approximately 60° from a horizontal position). Alternatively, when using the digital pen 115 as a highlighter, a user typically holds the digital pen 115 at a less upright position (e.g., less or equal than approximately 60°) because, for example, the user needs to see that he or she is highlighting. Accordingly, the digital inking application 110 can be configured to determine whether the current tilt position of the digital pen 115 is less than equal to the predetermined threshold associated with the second input mode and, if so, automatically switch the digital pen 115 to the second input mode.

In should be understood that the predetermined threshold for the second input mode can include various values, such as, for example, values between approximately 30° to 70°. Also, in some embodiments, ranges of values may be used as compared to single thresholds.

In some embodiments, the digital inking application 110 is also configured to automatically switch the digital pen 115 back to the first input mode (or another input mode, such as any mode specified as a default input mode for the pen 115) by continuing to detect a current tilt angle of the digital pen (e.g., for each detected ink stroke) and switching the digital pen 115 to the first input mode in response to detecting a current tilt angle that no longer satisfies the predetermined threshold associated with the second input mode. In addition, after switching the digital pen 115 to a particular input mode, the digital inking application 110 may require a particular change in tilt before switching the digital pen 115 to a different input mode (e.g., to prevent inadvertent or rapid switching between modes). Also, in some embodiments, before switching to a particular input mode, the digital inking application 110 may require a detected tilt angle of the pen 115 to satisfy (or not satisfy depending on the switch) the predetermined threshold for a particular time period (e.g., again to prevent inadvertent or rapid switching between modes).

In addition, in some embodiments, the digital inking application 110 can apply different thresholds (or ranges) based on the user (e.g., whether the user is right-handed or left-handed), the digital pen 115, the user device 105, or a combination thereof. For example, in some embodiments, the digital inking application 110 is configured to learn a particular tilt that a user operates the digital pen 115 when using the pen in a particular input mode and automatically set a learned tilt (or range thereof) as the predetermined threshold for the user (and optionally other users). The digital inking application 110 can learn these tilt angles based on reference tilt angles, which may obtained during normal use of the digital pen 115 after the user manually selects a particular input mode, based on prompts by the digital inking application 110 for the user operating the digital pen 115 to tilt the pen 115 in desired way for one or more different uses of the digital pen 115, or a combination thereof. Accordingly, the predetermined threshold described above can be customizable.

When the digital pen 115 is in highlighter mode, interactions detected between the digital pen 115 and the touchscreen 220 can be translated to ink points and digital strokes as described above, wherein the digital strokes are provided in a highlighter color (e.g., yellow, orange, pink, green, etc.) with a level of transparency that allows objects (such as digital ink) under the highlighting strokes to be seen through the highlighting strokes. In some embodiments, the highlighting strokes are stored as a digital ink instance as described above, which can be positioned on top of or otherwise overlaid over existing digital ink (e.g., dry ink) or other content within the canvas. In some embodiments, the digital inking application 110 can be configured to automatically format the highlighting strokes to position the strokes over adjacent digital ink or other content, to match a height of adjacent content, or the like. Similarly, in some embodiments, the digital inking application 110 can be configured to automatically smooth or straighten highlighting strokes to improve the visual appearance of the strokes. In other embodiments, when the digital pen 115 is in the highlighting mode, digital strokes can be used to trigger a pen command to update existing content (e.g., existing digital ink) such as to change the color of digital strokes, a color of a background provided by the canvas, or both. In other words, rather than creating highlighting as separate digital ink (which may be linked with the underlying content such that movement or manipulation of the underlying content automatically adjusts the associated highlighting), pen input representing highlighting strokes can be used to trigger command that edit existing digital ink to add formatting representing the highlighting.

It should also be understood that the digital pen 115 may include other types of input modes and, in some embodiments, these modes can be associated with particular tilt or positions of the digital pen 115, which allows the user to change the input mode of the digital pen 115 through changes in position, orientation, or grip on the pen 115, which results in more efficient switching and less distraction to the user. For example, in addition to or as an alternative to having a highlight mode, a digital pen 115 may have an underling mode, an italics mode, an underling mode, a selection mode, an eraser mode, a grouping mode, or a combination thereof Digital Ink Beautification Users may be hesitant to use digital ink because they may not be satisfied with their handwriting. To bring more harmony into the inking experience and give users more control over the aesthetics of their writing, the digital inking application 110 may be configured to "beautify" digital ink while retaining its personal style.

Figure 14:
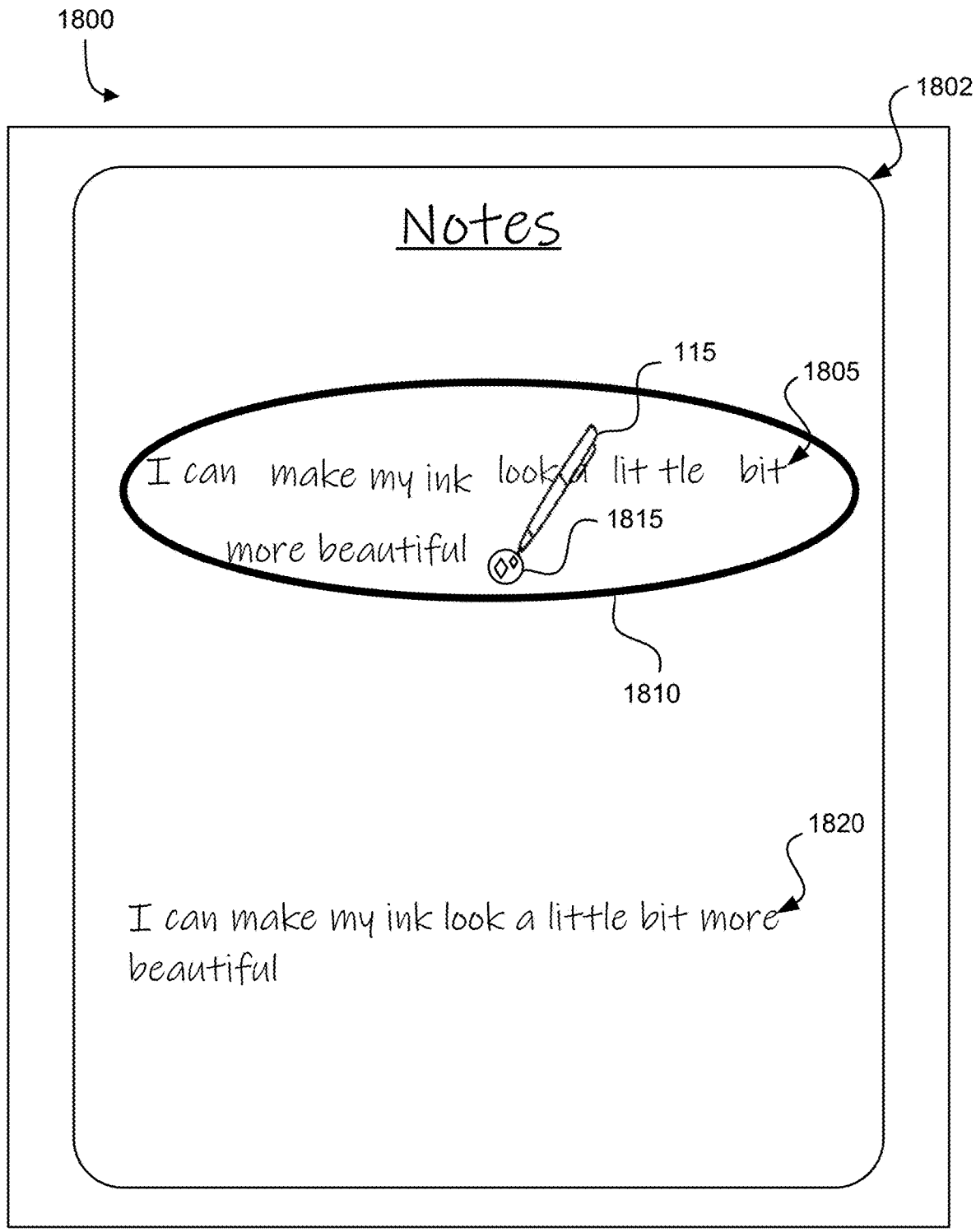
FIG. 14 illustrates a user interface provided by the digital inking application including "beautified" within a canvas digital ink according to some embodiments.

For example, FIG. 14 illustrates a user interface 1800 provided by the digital inking application 110. The user interface 1800 includes a portion of an electronic document (e.g., a digital journal) within a canvas 1802. As illustrated in FIG. 14, the canvas 1802 includes a digital ink instance 1805 within an electronic document. To "beautify" the digital ink instance 1805, a user uses the digital pen 115 to draw a predetermined signifier associated with a "beautify" command. As illustrated in FIG. 14, in some embodiments, this predetermined signify includes a predetermined mark 1810 adjacent to the digital ink instance 1805 (e.g., within a predetermined distance from the instance 1805, around the instance 1805, or the like). In some implementations, the predetermined mark 1810 may be a circle, a square, a triangle, or other predetermined shape. In some embodiments, the predetermined signifier also includes a second predetermined mark 1815, which may be a symbol drawn adjacent to the digital ink instance 1805, adjacent to the first predetermined mark 1810, or both. It should be understood that in some embodiments, only one of the first predetermined mark 1810 and the second predetermined mark 1815 is used to invoke the "beautify" command.

The digital inking application 110 identifies the predetermined marks 1810 and 1815 as invoking the "beautify" command and generates a new digital ink instance 1820 or updates the existing digital ink instance 1805 to improve the formatting of the contents without, in some embodiments, changing the ink contents.

For example, as illustrated in FIG. 14, invoking the "beautify" command can modify the contents of the marked digital ink 1850 align lines to the left of the canvas 1802, align words to a baseline in each line, unify line spacing between lines in the same paragraph, unify word spacing between words in the same line, or a combination thereof. In some embodiments, the digital inking application 110 uses various services, such as various application programming interfaces, to identify characters, words, and word groups (e.g., lines or paragraphs) within digital ink (e.g., using various handwriting analysis tool) and to compute font metrics (e.g., descender, baseline, meanline, ascender, etc.). For example, the digital inking application 110 may be configured to determine a minimum, an average, a maximum, or other default character height and, by identifying individual characters within the digital ink, such as by using handwriting analysis tools, and modify the digital strokes making up a particular character to have a particular height. Similarly, the position of individual characters (i.e., the associated digital strokes defining a character) can be modified to align characters on a common baseline and, optionally, meanline, descender, ascender, or a combination thereof. In some embodiments, as illustrated in FIG. 14, the digital inking application 110 can also beautify digital ink by reflowing the contents of the digital ink based on the available space within the canvas 1802.

As illustrated in FIG. 14, in some embodiments where a new digital ink instance is generated including the beautified version of the selected digital ink instance 1805, this new digital ink instance can be added to the canvas as a separate instance 1820. Alternatively, in other embodiments, the original digital ink instance 1805 can be updated to perform the beautification or replaced with a newly generated digital ink instance. In some embodiments, the beautified digital ink instance can retain (e.g., as part of the DOM) the original ink points and digital strokes and merely apply formatting to the data when rendering the digital ink within the canvas. Retaining the original ink points and digital strokes enables the user to return to the original digital ink (i.e., undo a requested beautification).

Although some inking application may provide page templates with grids, lines, or dots to aid a user in aligning digital ink, the digital inking application 110 can be configured to re-format digital ink without merely changing the digital to text and without requiring that the user ink in certain areas of the canvas or on guided lines or other templates. Thus, the digital inking application 110 enables users to freely ink on a canvas while understanding the ink's layout hierarchy, which allows the application 110 to align digital ink and adjust spacing at various levels (e.g., characters, lines, paragraphs, lists, etc.). In some embodiments, the digital inking application 110 can also compute a rotation angle of lines, which allows the digital inking application 110 to rotate lines (e.g., horizontally), such as to a particular slant level. For example, as handwritten content often includes a particular slant, the digital inking application 110 can remove this slant or can unify the slant to preserve the unique handwritten nature of content.

It should be understood that the "beautify" command can be invoked in additional or alternative ways than the pen command described above. For example, in some embodiments, a user can select digital ink (e.g., using a select input mode of the digital pen 115, a lasso tool, or the like) and then select a "beautify" option from a menu or toolbar included in the digital inking application 110 or using various pen gestures, such as a press and hold of the digital pen 115 on the touchscreen to access a menu or mode or automatically invoke the "beautify" command. In still other embodiments, the user can turn on automatic beautification, which automatically invokes the "beautify" command for digital ink periodically or in response to a particular trigger, such as when the user pauses while inking (e.g., no new digital ink or other input from the digital pen 115 is received for a predetermined amount of time). Similarly, in some embodiments, the digital inking application 110 can be configured to apply only particular types of "beautification" when the "beautify" command is invoked to allow a user to apply only one or more types of beautification or beautification at particular levels (e.g., at a line level but not a character level). For example, the digital inking application 110 can apply one or more types of "beautifications" as established by one or more configurations, which may be set by a user or automatically selected based context (e.g., the language used in the digital ink). For example, although the "beautification" illustrated in FIG. 14 aligns lines to the left, the digital inking application 110 can be configured to align lines in other formats, such as center-aligned or right-aligned. In particular, as one example, the digital inking application 110 may be configured to left-align digital ink written in English or other Latin-based languages since these languages are read left to right. However, the digital inking application 110 may be configured to right-align digital ink written in Arabic as this language is read right to left.

In some embodiments, the "beautify" command can be invoked as part of other commands or functionality provided by the digital inking application 110. For example, as described above with respect to the "aggregation" command, the duplicated digital ink instance, as added to the appropriate aggregation page, can be beautified to create an aesthetically pleasing and organized list or page.

Digital Ink Reflow

Similar to the beautification described above, in some embodiments, the digital inking application 110 is configured to reflow digital ink. In particular, the digital inking application 110 can be configured to reflow of digital ink content as a user inserts or removes content without requiring that the content of the digital ink be initially converted to text. Furthermore, in some embodiments, the digital inking application 110 enables a user to invoke a "reflow" command using a pen command, which eliminates the need for a user to switch tools (e.g., from an inking tool or mode to an editing tool or mode).

Figure 15A:
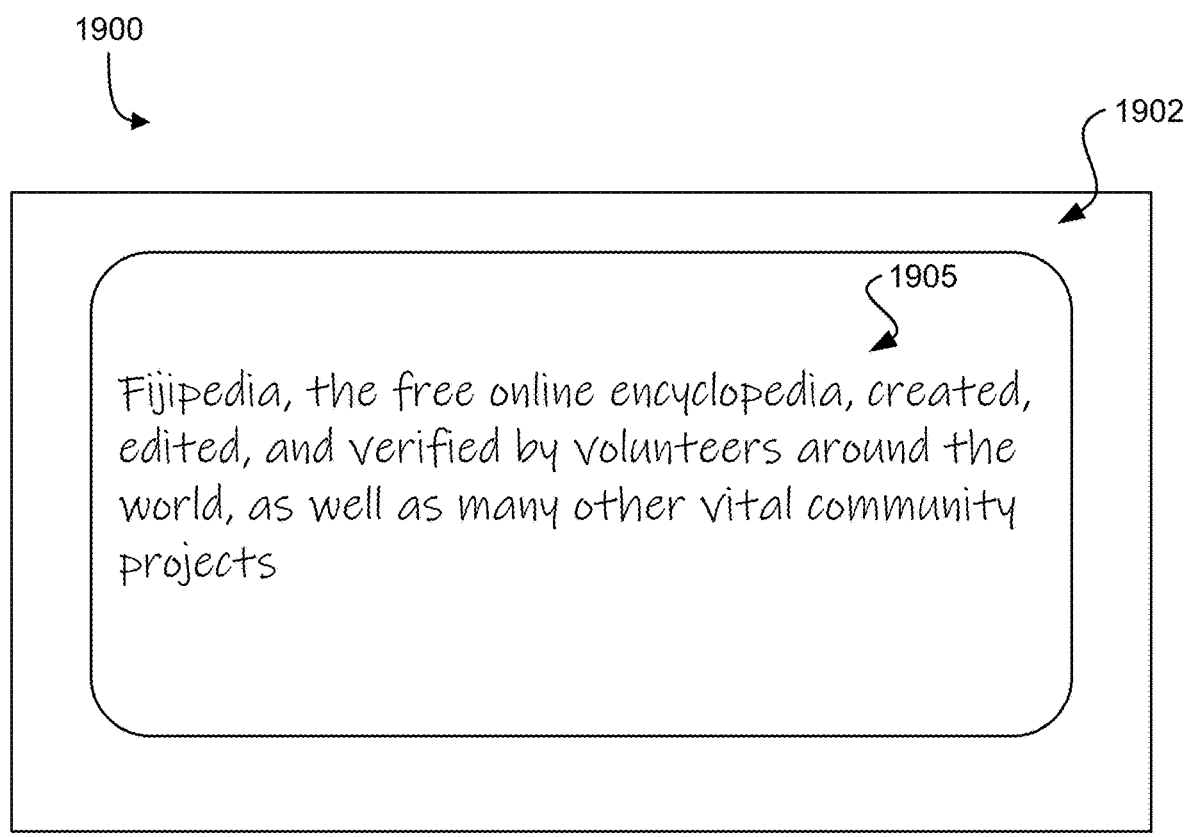
FIGS. 15A, 15B, and 15C illustrates user interfaces provided by the digital inking application illustrating reflowing of digital ink within a canvas according to some embodiments.

For example, FIG. 15A illustrates a user interface 1900 provided by the digital inking application 110. The user interface 1900 includes a portion of an electronic document (e.g., a digital journal) within a canvas 1902. As illustrated in FIG. 15A, the canvas 1902 includes a digital ink instance 1905 within an electronic document. To invoke a "reflow" command for the digital ink instance 1905, a user can draw a line (e.g., a vertical line) within (e.g. overlaid on) the digital ink instance 1905 at a position where the user wants to reflow the content of the digital ink (e.g., make remove for the insertion of additional digital ink content or remove excess whitespace within the digital ink content). After drawing the line and, in some embodiments, without releasing the digital pen 115 from the touchscreen 220, the user can press and hold the pen 115 to the touchscreen 220 to convert the line into a command line. After the line is converted to a command line, the user can drag, with the digital pen 115, the command line (e.g., left and right) to reflow the digital ink within the digital ink instance 1905 to create room within the digital ink instance to insert additional ink or to remove excess whitespace. Reflowing content of a digital ink instance can be performed by modifying the position (e.g., vertical, horizontal, or both) of the ink points, digital strokes, or both of the digital ink instance as stored in the DOM.

Figure 15B:
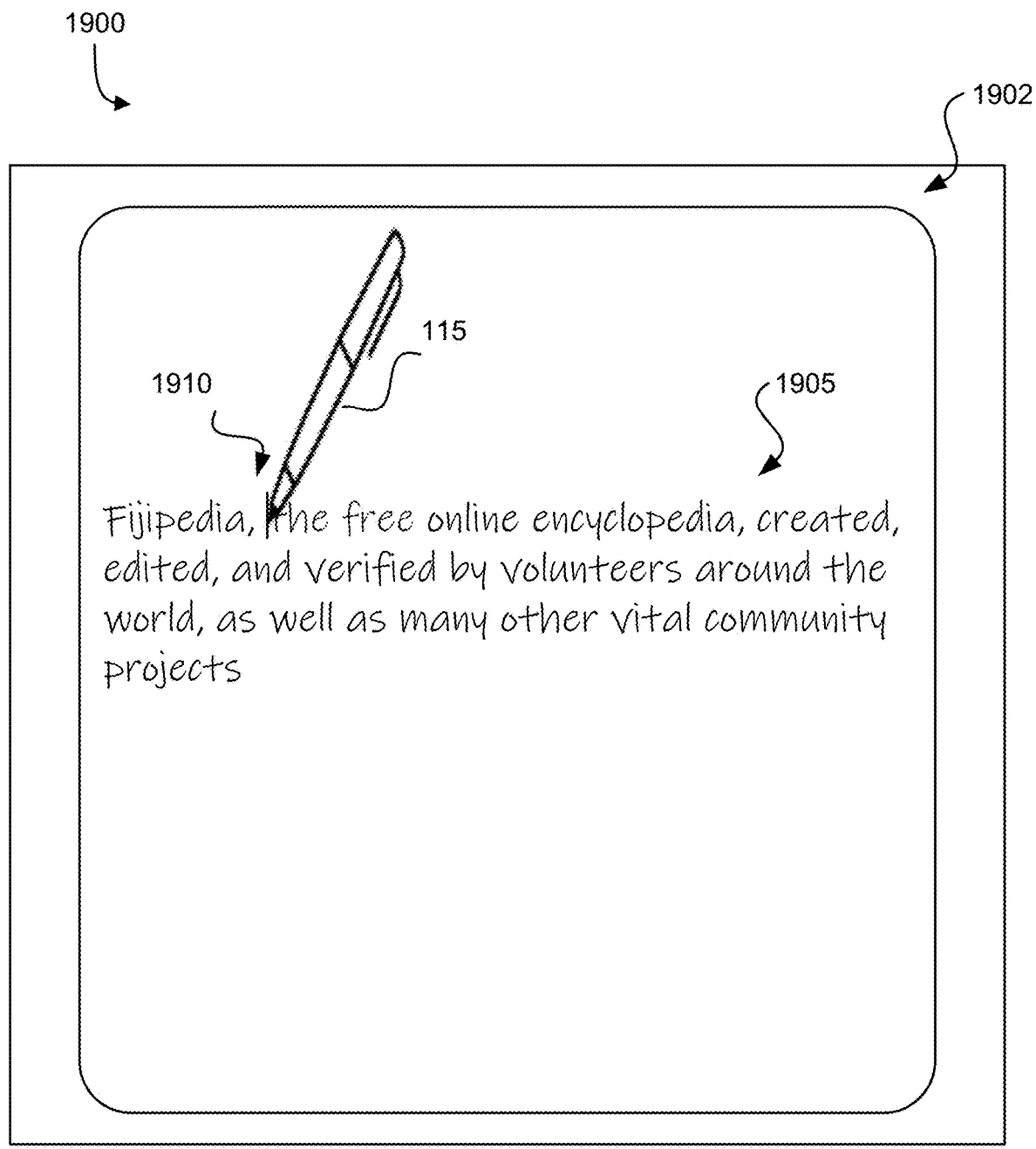
Figure 15C:
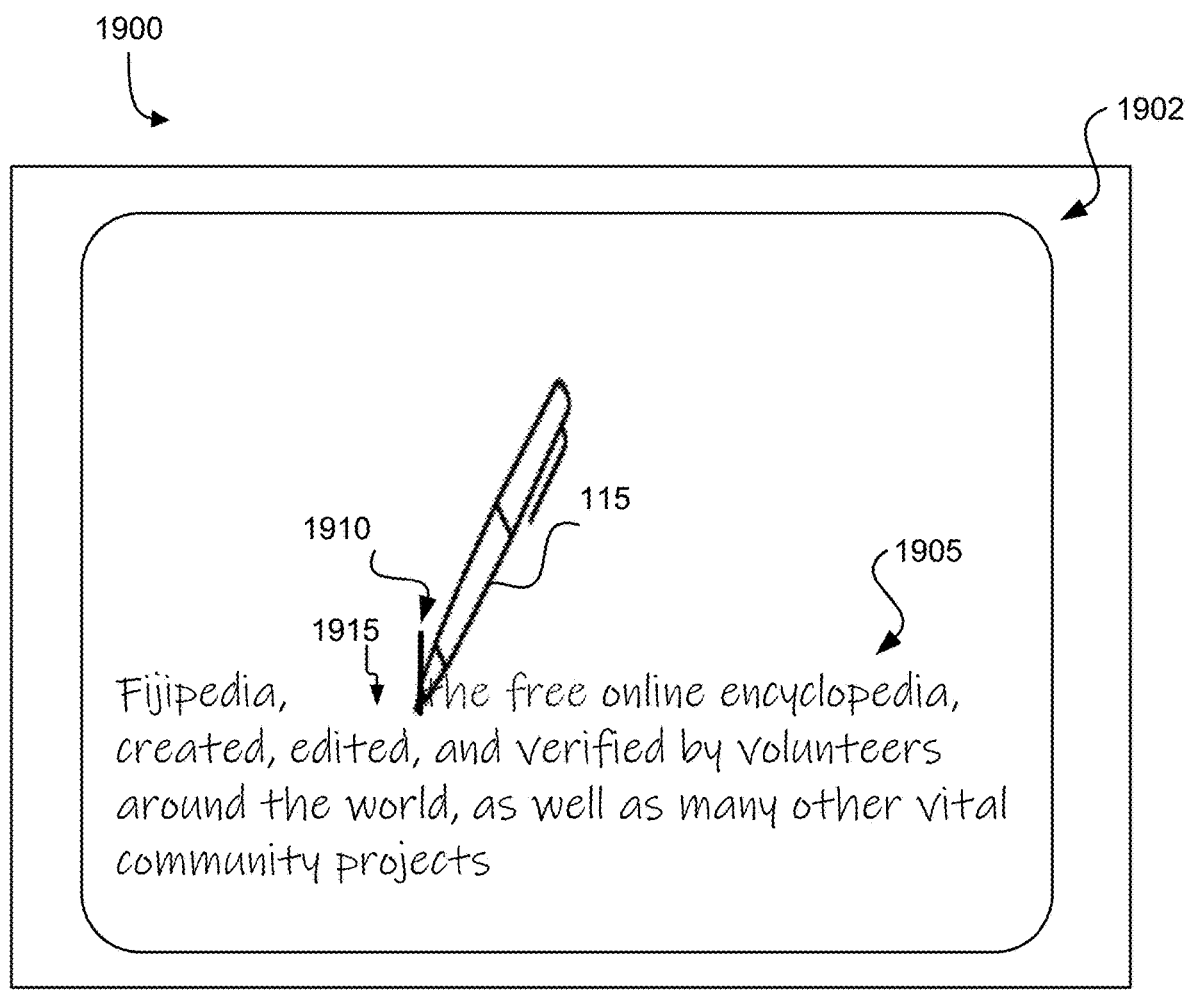

For example, FIG. 15B illustrates the digital ink instance 1905 where a user has drawn a line 1910 the word "the" included in the digital ink instance 1905. After pressing and holding the digital pen 115, the digital inking application 110 converts the line 1910 into a command line, which the user can drag to the left or the right. As illustrated in FIG. 15C, in response to the user dragging the command line 1910 to the right, the contents of the digital ink instance 1905 (positioned to the right of the command line) is reflowed to add whitespace 1915 within the digital ink instance 1905 (i.e., before or to the left of the word "the" where the line 1910 was originally drawn). Similarly, in response to the user dragging the command line 1910 to the left, the space between the word "the" and the word "Fijipedia," can be reduced or eliminated.

Accordingly, the digital inking application 110 can be configured to perform reflow on raw digital ink without requiring that the digital ink be converted to text. In addition, for paragraph reflow, user interface interaction is minimized as a user can draw a line as a pen command and can then drag the line without need to initially lift the pen 115 or perform other gestures or actions. Furthermore, in some embodiments, the "reflow" command can be automatically invoked in response to a user removes contents of a paragraph or line or drags and drops a word into an existing line. Similarly, in lists of digital ink instance, the "reflow" command can be automatically invoked in response to a user adding (e.g., dragging and dropping) a new ink instance into the list or removing an ink instance from the list. For example, when creating an aggregation page as described above, the digital inking application 110 can be configured to automatically reflow an existing list of digital ink instances as a user marks (i.e., with a predetermined signifier in digital ink) additional digital ink instances to be duplicated and aggregated on the page.

Similar to the beautification described above, in some embodiments, reflowing a digital ink instance maintains the original ink points, digital strokes, or both (as stored in the DOM) but updates the positions of the ink points, digital strokes, or both to reflect the new formatting of the contents. Accordingly, even when reflowing digital ink contents, the handwriting style can be maintained.

Digital Ink Instance Boundary Reveal and Group

As described above, to perform digital ink editing, a user may be required to select a digital ink instance to be edited (e.g., by marking the digital ink instance with a predetermined signifier in digital ink, using a lasso tool, select the instance with the digital pen in a selection input mode, or the like). When a portion of an electronic document includes multiple digital ink instances or even multiple words, phrases, lines, or paragraphs, the user may not know what digital ink content is included in a particular digital ink instance. Although a user may be able to see boundaries of a particular digital ink instance after selecting particular content within a canvas, when the revealed boundaries are not what the user thought or expected, they may have to cancel the selection and potentially undo editing that may be performed in response to selecting the instance, which is inefficient and wastes computing resources.

Accordingly, to solve these and other issues, the digital inking application 110 can be configured to provide a "reveal" or "inspect" command that allows a user to preview boundaries of a digital ink stance (before actually selecting the instance), which allows the user to verify the boundaries and edit the boundaries of an ink instance as needed before selecting the instance, editing the instance, or both.

Figure 16:
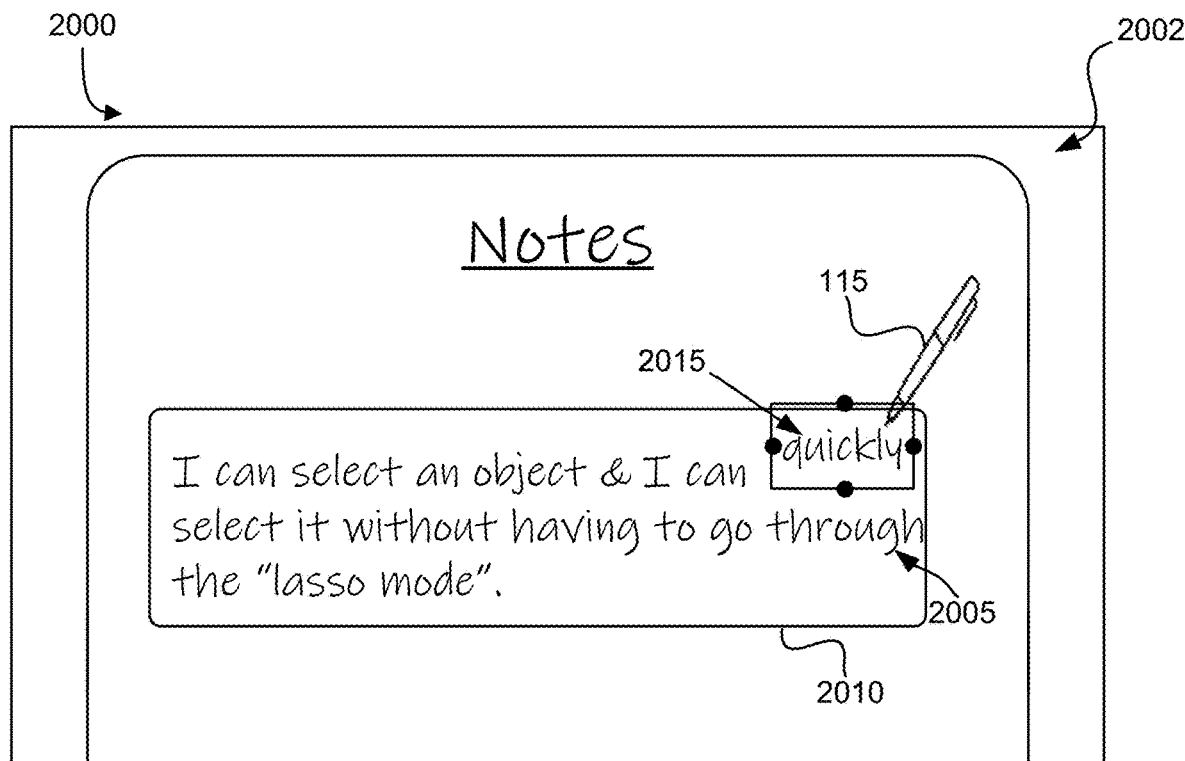
FIG. 16 illustrates a user interface provided by the digital inking application revealing boundaries of a digital ink instance within a canvas according to some embodiments.

FIG. 16 illustrates a user interface 2000 provided by the digital inking application 110. The user interface 2000 includes a portion of an electronic document (e.g., a digital journal) within a canvas 2002. As illustrated in FIG. 16, the canvas 2002 includes a digital ink instance 2005 within an electronic document. To invoke an "inspect" command for the digital ink instance 2005, a user can hover the digital pen 115 (while being operated in an inking mode where the pen 115 can be used to add digital ink to the canvas 2002) adjacent to the digital ink instance 2005, such as to the left of the digital ink instance 2005. In response to detecting this particular pen gesture, the digital inking application 110 updates the canvas 2002 to disclose the boundaries of the digital ink instance 2005, such as using a boundary graphic 2010 (e.g., a box) as illustrated in FIG. 16. It should be understood that other icons or graphics can be used to designate which digital ink content is included within a digital ink instance positioned adjacent to the hovering location of the digital pen 115. For example, content included within a digital ink instance can be highlighted, pulsed, underlined. Similarly, in some embodiments, corner edges, partial lines, or other graphics can be used to indicate the boundaries.

In the embodiment illustrated in FIG. 16, the boundary graphic 2010 surrounds or otherwise marks what digital ink content is included in the digital ink instance 2005 and what digital ink content is not included. Thus, the boundary graphic 2010 enables the user to see what content will be edited if the user invokes a particular command on the digital ink instance 2005. If the contents are not what the user expected or desires, the user can edit the digital ink instance 2005. For example, a user can add additional content to the digital ink instance, such as by dragging and dropping other digital ink content 2015 on the digital ink instance 2005 as illustrated in FIG. 16.

Figure 17:
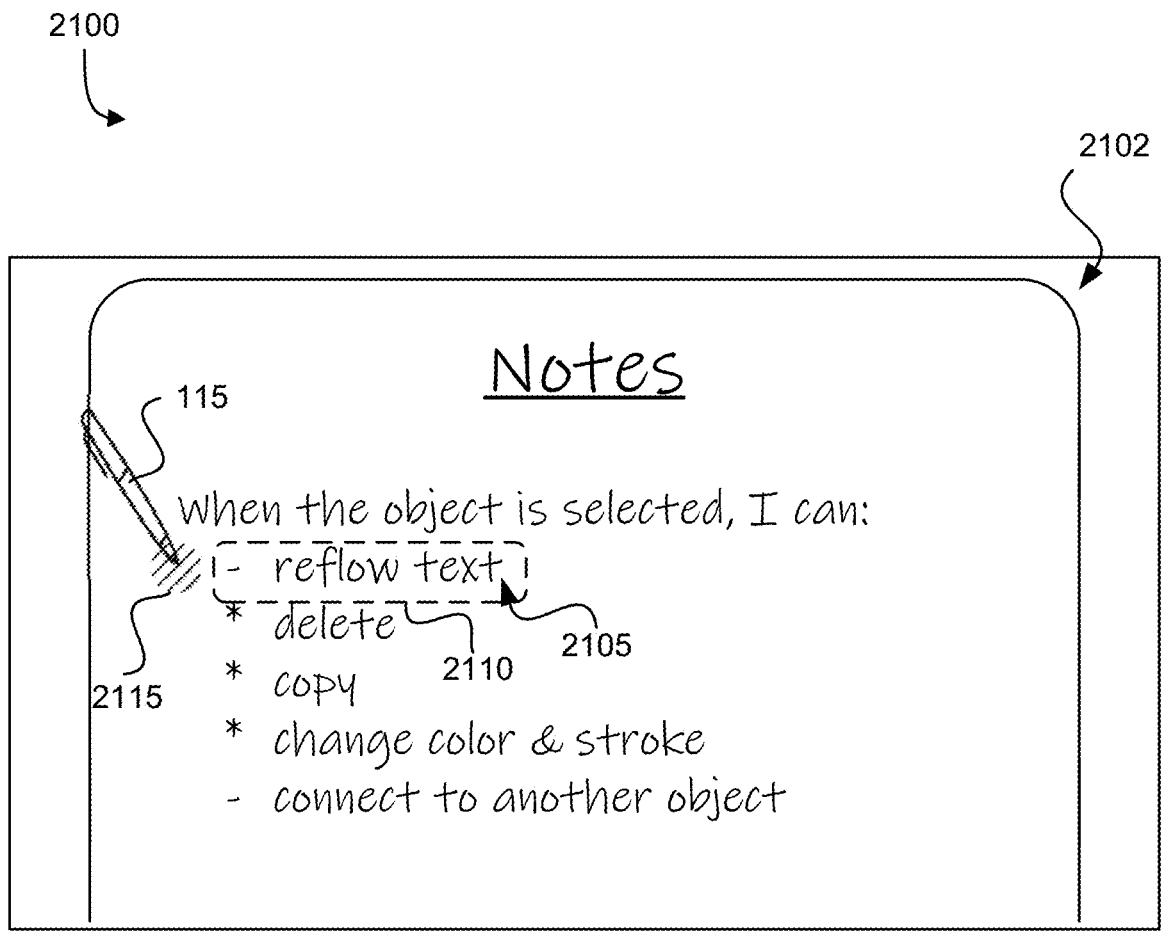
FIG. 17 illustrates a user interface provided by the digital inking application including a selected digital ink instance within a canvas according to some embodiments.

In some embodiments, when previewing the boundaries of the digital ink instance 2005, the user can quickly select the digital ink instance by tapping or selecting the pen 115 at the same location where the pen 115 was hovering to reveal the boundaries. Thus, the user does not need to cancel the preview and subsequently perform a selection of the digital ink instance 2005, such as by activating a lasso tool or changing an input mode of the digital pen 115. For example, FIG. 17 illustrates a user interface 2100 illustrating the digital pen 115 hovering left of the digital ink instance 2105 including the content "-reflow text" within a canvas 2102. This hovering triggers the "inspect" command as described above, which adds a boundary graphic 2110 to the canvas 2102 to indicate the boundaries of the digital ink instance 2105. As also illustrated in FIG. 17, the digital inking application 110 can add an icon 2115 to the canvas 2102 that indicates where a user can tap (while the boundary graphic 2110 is being displayed) to select the digital ink instance 2105 associated with the boundary graphic 2110. As described above, in response to receiving a tap or selection of the icon 2115 with the digital pen 115, the digital inking application 110 is configured to select the digital ink instance 2105, which allows the user to move the instance 2105 (e.g., by dragging and dropping the instance 2105, which can reflow digital ink as described above), invoke another editing command on the instance 2105 (e.g., copy the instance 2105, delete the instance 2105, change a color or other display property of the instance 2105), connect the instance 2105 to another object, or the like. Alternatively, in response to receiving a tap or interaction of the digital pen 115 with the touchscreen outside of the icon 2115, the digital inking application 110 may be configured to remove the boundary graphic 2110 and the icon 2115 from the canvas 2102. The digital inking application 110 may similarly remove the boundary graphic 2110 and the icon 2115 from the canvas 2102 in response to the hover position of the digital pen 115 changing by a predetermined amount (e.g., indicating that the digital pen 115 is no longer positioned adjacent to the digital ink instance 2105).

Figure 18:
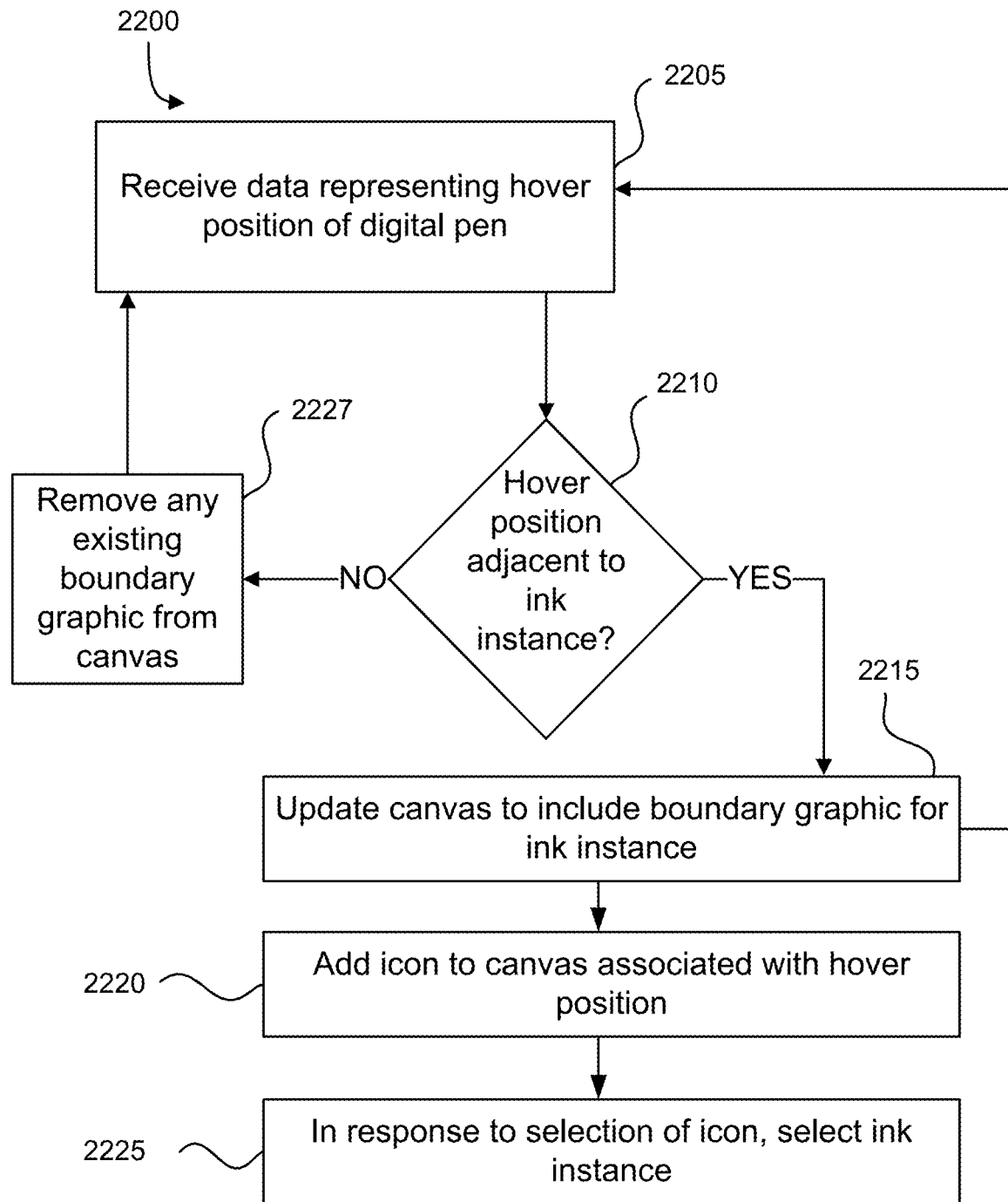
FIG. 18 is a flow chart illustrating a method of revealing boundaries of a digital ink instance according to some embodiments.

FIG. 18 is a flow chart illustrating a method 2200 for inspecting or revealing boundaries of a digital ink instance according to some embodiments. The method 2200 is described as being performed by the digital inking application 110 (and the components described above with respect to FIG. 3) as executed by the electronic processor 204 of the user device 105. However, as noted above, in some embodiments, the method 2200 or portions thereof may be performed by the digital inking service 130 provided via the server 140.

As illustrated in FIG. 18, the method 2200 includes receiving data representing a hover position of the digital pen 115 (at block 2205). In some embodiments, the digital inking application 110 is configured to detect the hover position of digital pen 115 based on data received from the digital pen 115 when the pen 115 includes an active pen. Alternatively or in addition, the digital inking application 110 can be configured to detect the hover position of the digital pen 115 based on other data sources, such as one or more cameras included in the user device 105 configured to detect a position of the digital pen 115, components configured to detect the presence of the digital pen 115 through the touchscreen 220 even the digital pen 115 is not contacting the touchscreen 220, or the like.

Based on the hover position, the digital inking application 110 determines if the hover position is adjacent to an existing digital ink instance (e.g., within a predetermined distance to the left of an existing digital ink instance) (at block 2210). In some embodiments, if multiple existing digital ink instances are positioned adjacent to the hover position, the digital inking application 110 may use the digital ink instance that is positioned closest to the hover position. In some embodiments, the digital inking application 110 also determines whether the hover position has been maintained for a predetermined amount of time (e.g., to ensure that the user is intended to invoke the "inspect" command and not just moving the digital pen 115 for other purposes).

In response to the hover position being adjacent to an existing digital ink instance within the canvas (at block 2210), the digital inking application 110 updates the canvas to display a boundary graphic for the digital ink instance, wherein the boundary ground defines the bounds or what content within the canvas is included in the digital ink instance (at block 2215). As noted above, the boundary graphic can take various forms and, in some embodiments, includes a bounding box.

In some embodiments, the digital inking application 110 is also configured to, in response to the hover position being adjacent to an existing digital ink instance, display an icon within the canvas corresponding to the hover position (at block 2220). In response to receiving a selection or tap of the icon (e.g., with the digital pen 115), the digital inking application 110 is configured to select the digital ink instance (currently displayed with the boundary graphic) as an active or selected item similar to when user selects a digital ink instance using a lasso tool, a finger tap, or another selection mechanism (at block 2225). After the digital ink instance is selected, a user can move or otherwise manipulate the instance. As noted above, in response to receiving a selection or tap (e.g., with the digital pen 115) outside of the icon, the digital inking application 110 can cancel the "inspect" command, which removes both the boundary graphic and the icon from the canvas. Also, in some embodiments, as illustrated in FIG. 18, in response to the hover position of the digital pen 115 changing so that it is not adjacent to a digital ink instance within the canvas (at block 2210), the digital inking application 110 is configured to remove any existing boundary graphic from the canvas (at block 2227).

According, the "inspect" command allows a user to perform more precise manipulation of digital ink in an efficient manner. For example, not only can a user confirm what content is included in a particular digital ink instance before going through the process of selecting the instance (which often requires an input mode switch and may automatically apply editing to the selected instance) but the user can subsequently select the instance without having to go through the normal context switch (from inking mode to selection mode). Also, as compared to selecting content using a lasso tool, a finger touch, or another mechanism, using the boundary reveal allows a user to make a more accurate selection. For example, when different ink objects are close together within a canvas, it can be difficult to accurate make a selection using a lasso or a finger touch.

Thus, embodiments described herein provide, among other things, systems and methods of digital inking and digital ink editing. In particular, embodiments, described herein provide a digital inking application configured to invoke various commands in response to detected pen gestures, which eliminate or reduce the amount of input and associated computing resources needed to perform desired functionality. For example, embodiments described herein enable a user to use natural gestures with a digital pen within a canvas to invoke various functionality. Some embodiments described herein also ease the difficulty of modifying digital ink while preserving the aesthetic structure and organization of an electronic document (i.e., without requiring that the user convert handwritten content to text). It should be understood that the pen gestures (i.e., positions, predetermined signifiers in digital ink, and the like) described herein as provided as examples and the pen gestures can take different form to invoke particular commands. For example, a circle illustrated as a predetermined signifier for a particular pen command can, in some embodiments, be a different shape or symbol and may have fewer or different requirements in terms of size, position, timing (e.g., continuous stroke or multiple strokes, etc.), or the like. In fact, in some embodiments, a user can customize or otherwise configure the digital inking application 110 to define user-specific pen gestures and associated signifiers. Also, in some embodiments, various machine learning techniques can be applied by the digital inking application 110 to automatically learn signifiers written by a user via a digital pen that may be associated with particular commands or functionality to create a customized inking environment for a user. Various features and advantages are set forth in the following claims.

What is claimed is:

1. A system for aggregating digital ink instances within an electronic document, the system comprising:
a memory configured to store instructions; and
an electronic processor coupled to the memory, wherein the electronic processor, through execution of the instructions stored in the memory, is configured to:
receive detected interactions between a touchscreen and a digital pen representing one or more digital strokes within a canvas;
determine whether the one or more digital strokes match a predetermined signifier that signifies a command to aggregate ink instances of a specific type; and
in response to determining that the one or more digital strokes match the predetermined signifier:
determine a first digital ink instance included in the electronic document based on a position of the one or more digital strokes within the canvas,
duplicate the first digital ink instance to create a second digital ink instance,
add the second digital ink instance to a designated portion of the electronic document that is pre-designated for aggregating ink instances of the specific type, and
update metadata of the first digital ink instance to include the type of the first digital ink instance, the type being associated with the predetermined signifier and the type being associated with the designated portion of the electronic document.

2. The system of claim 1, wherein the predetermined signifier includes a predetermined mark having a predetermined shape.

3. The system of claim 1, wherein the electronic processor is configured to determine the first digital ink instance by identifying the first digital ink instance as having a position within the canvas adjacent to the one or more digital strokes.

4. The system of claim 1, wherein the electronic processor is configured to determine the first digital ink instance by identifying the first digital ink instance as having a position within the canvas adjacent to the one or more digital strokes in a predetermined direction.

5. The system of claim 1, wherein the second digital ink instance references a plurality of ink points and a plurality of digital strokes of the first digital ink instance.

6. The system of claim 1, wherein the electronic processor is further configured to, in response to receiving an update to the second digital ink instance, apply the update to the first digital ink instance.

7. The system of claim 1, wherein the electronic processor is further configured to, in response to receiving an update to the first digital ink instance, apply the update to the second digital ink instance.

8. The system of claim 1, wherein a predetermined portion of the electronic document includes a page of the electronic document aggregating digital ink instances of a predetermined type.

9. The system of claim 1, wherein the electronic processor is configured to add the second digital ink instance to the designated portion of the electronic document by reflowing content of the second digital ink instance to match an available space within the designated portion.

10. The system of claim 1, wherein the electronic processor is configured to add the second digital ink instance to the designated portion of the electronic document by reflowing existing content included in the designated portion to include the second digital ink instance.

11. The system of claim 1, wherein the electronic processor is configured to add the second digital ink instance to the designated portion of the electronic document by performing at least one action selected from a group consisting of aligning one or more lines of content of the second digital ink instance, aligning one or more words of content of the second digital ink instance, unifying line spacing among a plurality of lines of content of the second digital ink instance, and unifying word spacing among a plurality of words of content of the second digital ink instance.

12. A method of aggregating digital ink instances within an electronic document, the method comprising:
receiving, with an electronic processor, detected interactions between a touchscreen and a digital pen representing one or more digital strokes within a canvas;
determining, with the electronic processor, whether the one or more digital strokes match a predetermined signifier that signifies a command to aggregate ink instances of a specific type; and
in response to determining that the one or more digital strokes match the predetermined signifier:
determining, with the electronic processor, a first digital ink instance included in the electronic document based on a position of the one or more digital strokes within the canvas,
duplicating, with the electronic processor, the first digital ink instance to create a second digital ink instance,
adding, with the electronic processor, the second digital ink instance to a designated portion of the electronic document that is pre-designated for collecting ink instances of the specific type; and
updating metadata of the first digital ink instance to include specification of the type of the first digital ink instance, the type being associated with the predetermined signifier and the type being associated with the designated portion of the electronic document.

13. The method of claim 12, wherein the second digital ink instance references a plurality of ink points and a plurality of digital strokes of the first digital ink instance.

14. The method of claim 12, further comprising:
in response to receiving a first update to the second digital ink instance, applying the first update to the first digital ink instance; and
in response to receiving a second update to the first digital ink instance, applying the second update to the second digital ink instance.

15. The method of claim 12, wherein a predetermined portion of the electronic document includes a page of the electronic document aggregating digital ink instances of a predetermined type.

16. Non-transitory computer readable medium storing instructions that, when executed by an electronic processor, perform a set of functions, the set of functions comprising:

receiving detected interactions between a touchscreen and a digital pen representing one or more digital strokes within a canvas;

determining whether the one or more digital strokes match a predetermined signifier that signifies a specific type of ink instance; and in response to determining that the one or more digital strokes match the predetermined signifier:
- determining, within an electronic document, a first digital ink instance included in the canvas based on a position of the one or more digital strokes within the canvas, wherein the first digital ink instance has a position within the canvas adjacent to the one or more digital strokes in a predetermined direction,
- duplicating the first digital ink instance to create a second digital ink instance,
- adding the second digital ink instance to a designated portion of the electronic document that is pre-designated to collect ink instances of the specific type, and
- updating metadata of the first digital ink instance to include the type of the first digital ink instance, the type being associated with the predetermined signifier and the type being associated with the designated portion of the electronic document.

17. The non-transitory computer readable medium of claim 16, wherein the second digital ink instance references a plurality of ink points and a plurality of digital strokes of the first digital ink instance.

18. The non-transitory computer readable medium of claim 16, the set of functions further comprising:
- in response to receiving a first update to the second digital ink instance, applying the first update to the first digital ink instance; and
- in response to receiving a second update to the first digital ink instance, applying the second update to the second digital ink instance.

19. The non-transitory computer readable medium of claim 16, wherein a predetermined portion of the electronic document includes a page of the electronic document aggregating digital ink instances of a predetermined type.

* * * * *